(12) United States Patent
Zhai et al.

(10) Patent No.: US 12,204,620 B2
(45) Date of Patent: Jan. 21, 2025

(54) DATA PROCESSING METHOD, USER TERMINAL AND SERVERS

(71) Applicants: BEIJING BOE HEALTH TECHNOLOGY CO., LTD., Beijing (CN); BOE TECHNOLOGY GROUP CO., LTD., Beijing (CN)

(72) Inventors: Fang Zhai, Beijing (CN); Yanyang Hu, Beijing (CN); Hongliang Wang, Beijing (CN); Jiao Huang, Beijing (CN)

(73) Assignees: BEIJING BOE HEALTH TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 323 days.

(21) Appl. No.: 17/361,448

(22) Filed: Jun. 29, 2021

(65) Prior Publication Data
US 2022/0050891 A1    Feb. 17, 2022

(30) Foreign Application Priority Data
Aug. 13, 2020    (CN) .......................... 202010813335.0

(51) Int. Cl.
  *H04L 29/06* (2006.01)
  *G06F 21/32* (2013.01)
  *G06F 21/44* (2013.01)
  *G06F 21/62* (2013.01)
  *G16Y 20/40* (2020.01)

(52) U.S. Cl.
CPC .............. *G06F 21/32* (2013.01); *G06F 21/44* (2013.01); *G06F 21/6218* (2013.01); *G06F 2221/2141* (2013.01); *G16Y 20/40* (2020.01)

(58) Field of Classification Search
CPC ............................ G06F 21/44; G06F 21/6218
See application file for complete search history.

(56) References Cited

U.S. PATENT DOCUMENTS

| 11,461,444 B2* | 10/2022 | Yi ........................ G06Q 20/325 |
| 2016/0112260 A1* | 4/2016 | Pai .......................... H04L 63/10 |
| | | 709/222 |
| 2018/0301148 A1* | 10/2018 | Roman ................... H04W 4/70 |
| 2018/0367616 A1* | 12/2018 | Yang ....................... H04L 67/12 |

FOREIGN PATENT DOCUMENTS

| CN | 107145704 A | 9/2014 |
| CN | 104239415 A | 12/2014 |
| CN | 106156454 A | 11/2016 |
| CN | 106529142 A | 3/2017 |

OTHER PUBLICATIONS

First Office Action issued in the corresponding Chinese Application No. 202010813335.0, dated Jul. 29, 2024.

* cited by examiner

*Primary Examiner* — Jason K Gee
(74) *Attorney, Agent, or Firm* — Chiwin Law LLC

(57) ABSTRACT

A data processing method, a detection device administration server, a user terminal, a network server, and a data processing system are provided. The data processing method is applicable to a detection device administration server and includes: communicating with a first detection device; sending, in response to a user terminal of a user binding the first detection device through first identification information of the first detection device, a first detection request to the first detection device; and receiving, after the user completes the first detection, first detection data sent by the first detection device.

8 Claims, 12 Drawing Sheets

Health Management Center

Current Item: blood pressure

Detection Results

| Index name | Detection result | Reference value | Unit |
|---|---|---|---|
| Systolic blood pressure | 122 | 90-139 | mmHg |
| Diastolic blood pressure | 73 | 60-89 | mmHg |

Abandon the detection result, and detect again

Continue other item

DATA PROCESSING METHOD, USER TERMINAL AND SERVERS

CROSS-REFERENCE TO RELATED APPLICATIONS

The application claims priority to Chinese patent application No. 202010813355.0, filed on Aug. 13, 2020, the entire disclosure of which is incorporated herein by reference as part of the present application.

TECHNICAL FIELD

Embodiments of the present disclosure relate to a data processing method, a detection device administration server, a user terminal, a network server, and a data processing system.

BACKGROUND

The Internet of Things (IoT) involves connection of IoT devices and the Internet, for information exchange and communication, to implement intelligent identification, positioning, tracking, monitoring, and administration, etc. Products such as shared bicycles, mobile Point of sales (POS), telephone watches, and mobile vending machines are all practical applications of an IoT technology. The IoT technology is also used in scenarios such as smart cities, smart logistics, smart agriculture, smart transportation, and smart homes. The IoT technology can implement comprehensive perception, reliable transmission and intelligent processing between things.

SUMMARY

At least one embodiment of the present disclosure further provides a data processing method, applicable to a detection device administration server, and the method includes: communicating with a first detection device; sending, in response to a user terminal of a user binding the first detection device through first identification information of the first detection device, a first detection request to the first detection device; and receiving, after the user completes the first detection, first detection data sent by the first detection device.

For example, the data processing method provided by at least one embodiment of the present disclosure further includes: sending, in response to the user terminal binding the first detection device through the first identification information of the first detection device, first guidance information of the first detection device, wherein the first guidance information is presented in at least one form selected from the group consisting of text, voice, image, or video.

For example, in the data processing method provided by at least one embodiment of the present disclosure, the first guidance information includes at least one selected from the group consisting of function description of the first detection device and operation step description of the first detection device.

For example, the data processing method provided by at least one embodiment of the present disclosure further includes: sending the first identification information of the first detection device, to enable the user terminal to obtain the first identification information.

For example, in the data processing method provided by at least one embodiment of the present disclosure, the first identification information of the first detection device includes an electronic identity of the first detection device.

For example, the data processing method provided by at least one embodiment of the present disclosure further includes: sending the first detection data, for the user to view, to at least one selected from the group consisting of a detection device administration terminal, the user terminal, and a network server.

For example, the data processing method provided by at least one embodiment of the present disclosure further includes: communicating with a second detection device, after the user completes the first detection, in response to the user continuing detection; sending, in response to the user terminal binding the second detection device through second identification information of the second detection device, a second detection request to the second detection device; and receiving, after the user completes second detection, second detection data sent by the second detection device.

For example, the data processing method provided by at least one embodiment of the present disclosure further includes: sending the second detection data, for the user to view, to at least one selected from the group consisting of a detection device administration terminal, the user terminal, and a network server.

For example, the data processing method provided by at least one embodiment of the present disclosure further includes: sending the first detection data and the second detection data, for the user to view, in a form of combination detection data to at least one selected from the group consisting of the detection device administration terminal, the user terminal, and the network server.

At least one embodiment of the present disclosure further provides a data processing method, applicable to a detection device administration terminal, and the method includes: receiving, in response to a user completing first detection, first detection data, and at least partially supplying the first detection data to the user.

For example, the data processing method provided by at least one embodiment of the present disclosure further includes: supplying, in response to receiving first guidance information of a first detection device that is sent by a detection device administration server, the first guidance information to the user.

For example, the data processing method provided by at least one embodiment of the present disclosure further includes: supplying, in response to receiving first identification information of the first detection device that is sent by the detection device administration server, the first identification information to the user.

For example, the data processing method provided by at least one embodiment of the present disclosure further includes: receiving, after the user completes the first detection, in response to the user completing second detection, second detection data, and at least partially supplying the second detection data to the user.

For example, the data processing method provided by at least one embodiment of the present disclosure further includes: receiving, in response to the user completing the second detection, combination detection data based on the first detection data and the second detection data, and at least partially supplying the combination detection data to the user.

At least one embodiment of the present disclosure further provides a data processing method, applicable to a user terminal, and the method includes: acquiring first identification information of a first detection device, and sending information of binding the first detection device; and receiving, in response to a user completing first detection on the first detection device, first detection data, and at least partially supplying the first detection data to the user.

For example, the data processing method provided by at least one embodiment of the present disclosure further includes: acquiring, after the user completes the first detection, in response to the user continuing detection, second identification information of a second detection device, and sending the information of binding the second detection device; and receiving, in response to the user completing second detection on the second detection device, second detection data, and at least partially supplying the second detection data to the user.

For example, the data processing method provided by at least one embodiment of the present disclosure further includes: receiving, in response to the user completing the second detection, combination detection data based on the first detection data and the second detection data, and at least partially supplying the combination detection data to the user.

For example, the data processing method provided by at least one embodiment of the present disclosure, before the sending information of binding the first detection device, further includes: acquiring the user's identity information, to verify the user.

For example, in the data processing method provided by at least one embodiment of the present disclosure, the user's identity information includes at least one selected from the group consisting of user's identity document information, user's electronic identity information, and a user's biometric feature.

At least one embodiment of the present disclosure further provides a data processing method, applicable to a network server, and the method includes: acquiring first binding information of a user terminal of a user with respect to a first detection device, and sending the first binding information to a detection device administration server; receiving first detection data that are generated by the first detection device when detecting the user and are sent by the detection device administration server; and sending, in response to first request data from the user terminal, the first detection data to the user terminal.

For example, in the data processing method provided by at least one embodiment of the present disclosure, the network server includes an Internet of things (IoT) platform server and a user terminal backend server, the IoT platform server is configured to: acquire the first binding information of the user terminal with respect to the first detection device, and send the first binding information to the detection device administration server; and the user terminal backend server is configured to: receive the first detection data that are generated by the first detection device when detecting the user and are sent by the detection device administration server, and to send, in response to the first request data from the user terminal, the first detection data to user terminal.

For example, the data processing method provided by at least one embodiment of the present disclosure further includes: acquiring second binding information of the user terminal with respect to a second detection device, and sending the second binding information to the detection device administration server; receiving at least one selected from the group consisting of second detection data that are generated by the second detection device when detecting the user and are sent by the detection device administration server and combination detection data based on the first detection data and the second detection data; and sending, in response to the second request data from the user terminal, at least one selected from the group consisting of the second detection data and the combination detection data to the user terminal.

At least one embodiment of the present disclosure further provides a detection device administration server, including: a memory and a processor, wherein instructions are stored in the memory, and when loaded and executed by the processor, execute the method applicable to the detection device administration server.

At least one embodiment of the present disclosure further provides a detection device administration terminal, including: a memory and a processor, wherein instructions are stored in the memory, and when loaded and executed by the processor, execute the method applicable to the detection device administration terminal.

At least one embodiment of the present disclosure further provides a user terminal, including: a memory and a processor, wherein instructions are stored in the memory, and when loaded and executed by the processor, execute the method applicable to the user terminal.

At least one embodiment of the present disclosure further provides a network server, including: a memory and a processor, wherein instructions are stored in the memory, and when loaded and executed by the processor, execute the method applicable to the network server.

At least one embodiment of the present disclosure further provides a data processing system, and the data processing system includes: a detection device administration server, a detection device administration terminal, a network server, and a user terminal. The user terminal is configured to: acquire first identification information of a first detection device, and send information of binding the first detection device. The network server is configured to: acquire the first binding information of the user terminal with respect to the first detection device, and send the first binding information to the detection device administration server. The detection device administration server is configured to: communicate with the first detection device; send, in response to the user terminal of the user binding the first detection device through the first identification information of the first detection device, a first detection request to the first detection device; and receive, after the user completes the first detection, first detection data sent by the first detection device. The detection device administration terminal is configured to: receive, in response to the user completing first detection, the first detection data, and at least partially supply the first detection data to the user. The network server is configured to: receive, in response to the user completing the first detection, the first detection data, and send, in response to the first request data from the user terminal, the first detection data to the user terminal. The user terminal is further configured to: receive, in response to the user completing the first detection, the first detection data, and at least partially supply the first detection data to the user.

For example, the data processing system provided by at least one embodiment of the present disclosure further includes a digital human body terminal, and the digital human body terminal is configured to receive the first detection data from the network server, and at least partially provides to the user in the form of a digital human body.

For example, the data processing system provided by at least one embodiment of the present disclosure further includes a health data platform terminal, the network server is configured to perform data mining and analysis on the first detection data of the user to generate resident health data; the health data platform terminal is configured to receive and display the resident health data sent by the network server.

For example, the data processing system provided by at least one embodiment of the present disclosure further includes a monitoring administration terminal, the network server is further configured to analyze the first detection data of the user to generate health record information of the user, or to generate corresponding push messages based on abnormal health data of the user; the monitoring administration terminal is configured to receive and display the health record information sent by the network server, or receive and display the push messages sent by the network server.

BRIEF DESCRIPTION OF THE DRAWINGS

In order to clearly illustrate the technical solution of the embodiments of the present disclosure, the drawings of the embodiments will be briefly described in the following; it is obvious that the described drawings are only related to some embodiments of the present disclosure and thus are not limitative of the present disclosure.

FIG. 3A is a schematic diagram of a user interface of a first detection report provided by an embodiment of the present disclosure;

DETAILED DESCRIPTION

Figure 1:
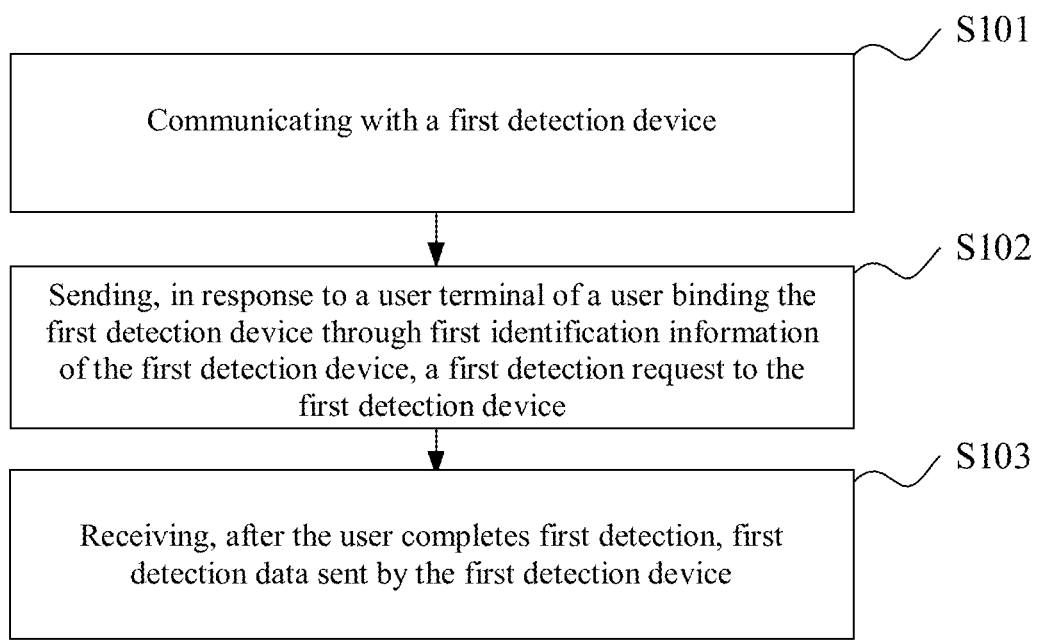
FIG. 1 is a flow chart of a data processing method applicable to a detection device administration server provided by an embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

In recent years, a trend of population aging has become more and more obvious, people's demand for healthy elderly care is increasing, and various smart elderly care projects have emerged in response to a wide range of market needs. Smart health care services can implement smart touch of old-age life and the Internet, improve quality of life of the elderly in their later years, and allow them to fully enjoy convenience and comfort brought by the Internet of Things.

An inventor of the present disclosure notices that a device of a general health management center cannot implement data interconnection and information sharing with a third-party platform such as a medical institution and a public health system in a true, effective, and real-time manner, which is likely to cause loss of long-term management data in a health management process. Resident health records involved in medical institutions, public health systems, etc. have not been effectively combined with detection data of a health management center, and various institutions cannot effectively implement screening, filing, dynamic hierarchical management, and health education for residents whenever and wherever possible.

At least one embodiment of the present disclosure provides a data processing method, a detection device administration server, a detection device administration terminal, a user terminal, a network server, and a data processing system. A data processing method applicable to a detection device administration server according to at least one embodiment of the present disclosure includes: communicating with a first detection device; sending, in response to a user terminal of a user binding a first detection device through first identification information of the first detection device, a first detection request to the first detection device; receiving, after the user completes the first detection, first detection data sent by the first detection device; and generating a first detection report based on the first detection data.

The data processing method provided by at least one embodiment of the present disclosure implements interconnection and intercommunication of respective terminals through interaction between the detection device administration server, the detection device administration terminal, the detection device, the network server, and the user terminal, as well as true, effective, and real-time transmission and integration of the detection data, so that the user can view the detection data conveniently, effectively and in real time, and data loss is not easily caused. Data interconnection and information sharing with a third-party platform (e.g., a medical institution, a public health system, etc.) can also be implemented in a true, effective, and real-time manner, which is favorable for subsequent operations such as data administration.

The question recommendation method provided according to at least one embodiment of this disclosure will be explained in a non-limiting way by several examples or embodiments. As described below, different features in these specific examples or embodiments can be combined with each other without conflicting, so as to obtain new examples or embodiments, which also belong to the scope of protection of this disclosure.

Figure 11:
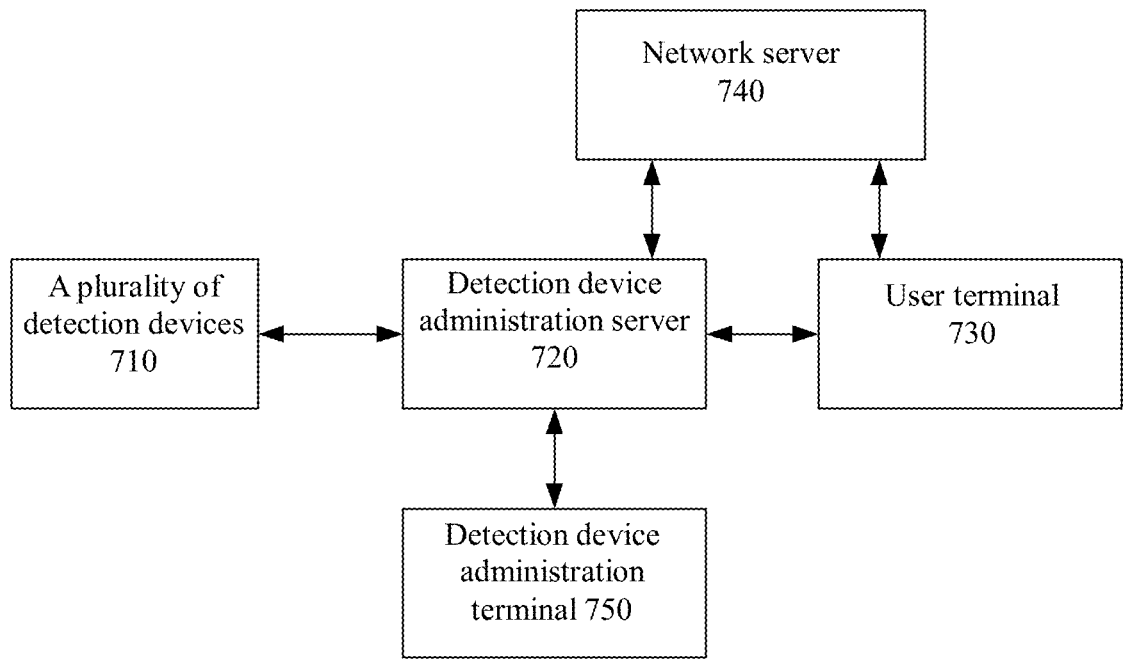
FIG. 11 is an architecture diagram of a data processing system provided by an embodiment of the present disclosure.

FIG. 11 is an administration architecture diagram of a detection device provided by an embodiment of the present disclosure. Referring to FIG. 11, the detection device 710 is in signal connection with the detection device administration server 720; the detection device administration server 720 is in signal connection with the detection device administration terminal 750; and the detection device administration server 720 is also in signal connection with the user terminal 730. The detection device 710 and the user terminal 730 associate and communicate through the detection device administration server 720. Similarly, the network server 740 is in signal connection with the detection device administration server 720; and the network server 740 is in signal connection with the user terminal 730. According to an example of the present disclosure, there may be a plurality of detection devices 710, detection device administration terminals 750, and user terminals 730, which are respectively in signal connection with the detection device administration server 720 to form a detection device administration network.

For example, in the embodiment of the present disclosure, the detection device administration terminal 750 may be a computer of a certain health detection station, or a workstation integrated machine of a certain smart health care center, etc., which will not be limited in the embodiment of the present disclosure. For example, the detection device administration server 720 may be a health management center system of a certain health management institution, or a health service center system of a certain smart health care center, which may be, for example, deployed on some computers or an integrated machine; of course, the detection device administration server 720 may be a cloud server or a local server, which will not be limited in the embodiment of the present disclosure. For example, the detection device administration server 750 may dock with one or more detection devices 710; and the detection data detected by the user on the detection device 710 may be sent to the detection device administration server 720 for storage or processing. For example, these detection devices 710 may include a height and weight detection device, a blood pressure measuring instruments, a heart rate measuring instrument, a non-invasive blood pressure detection device, a bone density detection device, a body composition detection device, etc., which will not be limited in the embodiment of the present disclosure. For example, in the embodiment of the present disclosure, the user terminal 730 may be a mobile phone terminal, a tablet computer, a notebook computer, etc., which will not be limited in the embodiment of the present disclosure. For example, in an embodiment of the present disclosure, the network server 740 may be a cloud server. For example, in some examples, the network server 740 may include an IoT platform server, and a business-specific server established corresponding to the user terminal 730, etc., which will not be limited in the embodiment of the present disclosure.

In the embodiment of the present disclosure, the detection device administration server 720 and one or more detection devices 710 may communicate with each other through a wired or wireless network, for example, may be located in a same local area network. Similarly, the user terminal 730, the detection device administration terminal 750, and the detection device administration server 720 may communicate with each other through a wired or wireless network. The wired network is, for example, a wired local area network, a wide area network, and a wired telephone communication network. The wireless network is, for example, a wireless local area network, a telecommunication mobile network (e.g., 2G/3G/4G/5G), etc. Similarly, the network server 740 and the detection device administration server 720 may communicate with each other through a wired or wireless network, and the network server 740 and the user terminal 730 may also communicate with each other through a wired or wireless network. It should be noted that, specific communication modes between them will not be limited in the embodiment of the present disclosure.

FIG. 1 is a flow chart of a data processing method applicable to a detection device administration server provided by an embodiment of the present disclosure. For example, referring to FIG. 1 and FIG. 7, the data processing method 10 applicable to the detection device administration server includes operations below:

Step S101: communicating with a first detection device;

Step S102: sending, in response to a user terminal of a user binding the first detection device through first identification information of the first detection device, a first detection request to the first detection device;

Step S103: receiving, after the user completes the first detection, first detection data sent by the first detection device.

It should be noted that, in the example of the present disclosure, step S101 to step S103 may be executed in sequence, or in other adjusted order, and part or all of the operations in step S101 to step S103 may also be executed in parallel, for example, step S101 and step S103 may be executed in parallel; and an execution order of the respective steps will not be limited in the embodiment of the present disclosure, and may be adjusted according to actual conditions. For example, in the example of the present disclosure, step S101 to step S103 may be executed in a separate server (e.g., a cloud server, etc.), or may also be implemented on a local terminal (e.g., on a detection device administration terminal), which will not be limited in the embodiment of the present disclosure. For example, in some examples, for implementing the data processing method 10 applicable to the detection device administration server provided by at least one embodiment of the present disclosure, some steps in step S101 to step S103 may be selectively executed, or some additional steps other than step S101 to step S103 may also be executed, which will not be specifically limited in the embodiment of the present disclosure.

In step S101, communication is conducted with the first detection device.

For example, in at least one embodiment of the present disclosure, the first detection device may be any detection device used for detecting a user, for example, a height and weight detection device, a blood pressure measuring instrument, a heart rate measuring instrument, a blood glucose measuring instrument, and a non-invasive blood pressure detection device, etc. For example, the device administration server and the first detection device may communicate with each other through a wired or wireless network. For example, in one example, by communicating with the first detection device, a connection is established between the detection device administration server and the first detection device, allowing the detection device administration server to authenticate the first detection device, for example, whether the first detection device is a registered detection device; if the first detection device is an unregistered detection device, complete the registration process, and supply registration information of the first detection device to, for example, the network server; or, the detection device administration server may receive, from the first detection device, detection data of the user that is detected on the first detection device. For example, in another example, by communicating with the first detection device, the detection device administration server may receive, from the first detection device, the identification information of the first detection device (e.g., an image code, e.g., a barcode, a two-dimensional code, etc.), or, when the first detection device is registered, the detection device administration server may pre-store the identification information for later use. For example, in still another example, by communicating with the first detection device, the detection device administration server may send request data (e.g., a detection request, etc.) to the first detection device, etc., which will not be limited in the embodiment of the present disclosure.

In step S102, in response to the user terminal of the user binding the first detection device with the first identification information of the first detection device, the first detection request is sent to the first detection device.

For example, in at least one embodiment of the present disclosure, the expression "a user terminal of a user binding a first detection device with first identification information of the first detection device" may refer to that, the user terminal (e.g., a mobile phone) of the user scans or inputs the first identification information of the detection device, so as to acquire the identification information of the first detection device, then generates a request of binding the first detection device by using the identification information, and sends the binding request to the network server; the network server receives the binding request and verifies whether the first detection device is a registered detection device based on the identification information; if yes, confirms the binding request and sends confirmation information to the user terminal, and may also send the same to the detection device administration server to notify the detection device administration server that a user has bound the first detection device (e.g., to avoid conflicts caused by binding by different users at a same time), so that the user terminal binds the first detection device. Alternatively, the network server does not send the binding request to the detection device administration server, but the user terminal directly sends the binding request to the detection device administration server to notify the detection device administration server that a user has bound the first detection device. The confirmation information includes, for example, user identification information; the detection device administration server or the first detection device may extract, according to the received confirmation information, user information of the user who currently binds the first detection device for use, and then, for example, append the user information to feedback information, for example, append to a detection report.

For example, the user uses an application such as an applet or an APP (e.g., a health cabin applet, a health online applet, etc.) on a mobile phone to scan a two-dimensional code of a blood pressure measuring instrument to bind the blood pressure measuring instrument. For another example, the user inputs an identification code (e.g., a password including letters, numbers, or other characters) corresponding to the blood pressure measuring instrument in an application such as an applet or an APP on a mobile phone, so as to bind the blood pressure measuring instrument subsequently.

In the embodiment of the present disclosure, for example, the first identification information of the first detection device may be presented in a form of two-dimensional code, which, for example, includes an electronic two-dimensional code, a printed paper two-dimensional code, etc., so that the user terminal scans to extract the first identification information contained therein. For example, the first identification information of the first detection device may also be presented in a form of password, for example, a digital password, a text password, etc., so that the user may input a corresponding password to select the first detection device.

For example, in at least one embodiment of the present disclosure, the detection device administration server may send the first identification information of the first detection device to the detection device administration terminal, to enable the user terminal to obtain the first identification information. For example, the first identification information of the first detection device may be an electronic identity of the first detection device. For example, identification information of the blood pressure measuring instrument may be an electronic two-dimensional code corresponding to the blood pressure measuring instrument. For example, the detection device administration terminal may supply the first identification information to the user in response to receiving the first identification information of the first detection device that is sent by the detection device administration server. For example, the detection device administration terminal (e.g., a computer of a health detection workstation, an integrated machine of a smart health care center, etc.) may have a display function, and the electronic two-dimensional code corresponding to the blood pressure measuring instrument may be displayed on a display panel of the detection device administration terminal, so it is convenient for the user to scan.

For example, in at least one embodiment of the present disclosure, the first detection device may have a display function, and the first identification information of the first detection device (e.g., the electronic two-dimensional code) may also be displayed on a display panel of the first detection device), to enable the user terminal to obtain the first identification information.

For example, in at least one embodiment of the present disclosure, the first identification information of the first detection device may be a printed paper two-dimensional code. In this case, the paper two-dimensional code, for example, may be placed near the corresponding first detection device, or may be pasted on a wall near the first detection device, etc., so it is convenient for the user to acquire the identification information.

For example, in at least one embodiment of the present disclosure, the first identification information of the first detection device may be a password, for example, a digital password. In this case, the user may select the first detection device by inputting a corresponding password. For example, the first identification information (i.e., the password) may be displayed on the display panel of the corresponding first detection device or the detection device administration terminal, or may also be placed near the corresponding first detection device in a paper form, or may also be supplied to the user in by voice broadcasting, thereby allowing the user terminal to obtain the first identification information.

It should be noted that, a specific mode in which the user terminal binds the first detection device through the first identification information of the first detection device will not be limited in the embodiment of the present disclosure, and may be set according to actual needs.

For example, in at least one embodiment of the present disclosure, after the user terminal of the user successfully binds the first detection device, the detection device administration server sends the first detection request to the first detection device. The first detection request causes the first detection device to be in a waiting state; for example, the first detection request contains user information of the user who currently binds the first detection device.

For example, in at least one embodiment of the present disclosure, in response to the user terminal binding the first detection device through the first identification information of the first detection device, the detection device administration server may send first guidance information of the first detection device to the detection device administration terminal, wherein the first guidance information may be presented in a form of text, voice, image or video. For example, in at least one embodiment of the present disclosure, the first guidance information includes at least one selected from the group consisting of function description of the first detection device and operation step description of the first detection device. For example, the first guidance information of the first detection device may be pre-stored in the detection device administration server, or the detection device administration server may acquire in real time via a network (which is favorable for timely updating the first guidance information).

Figure 2A:
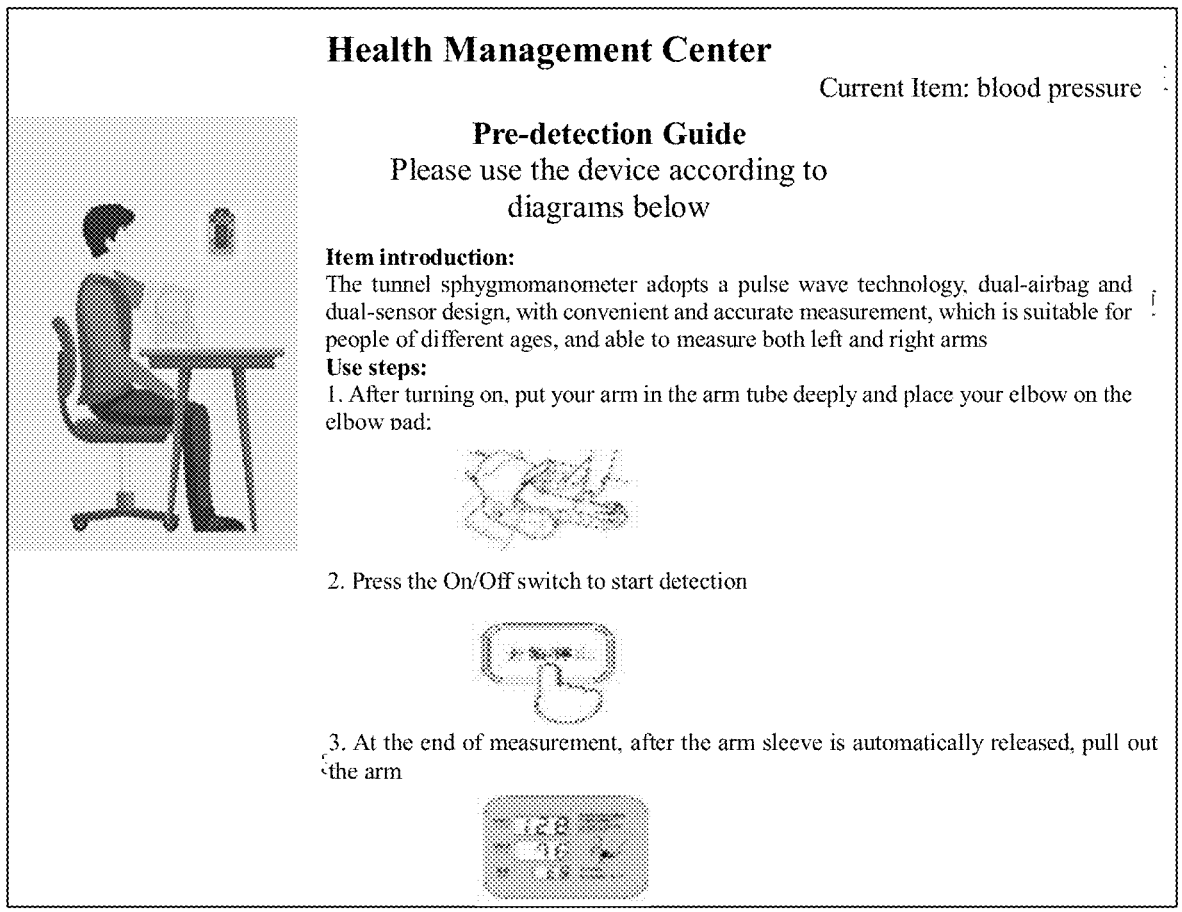
FIG. 2A is a schematic diagram of a user interface of pre-detection guide provided by an embodiment of the present disclosure.
Figure 2B:
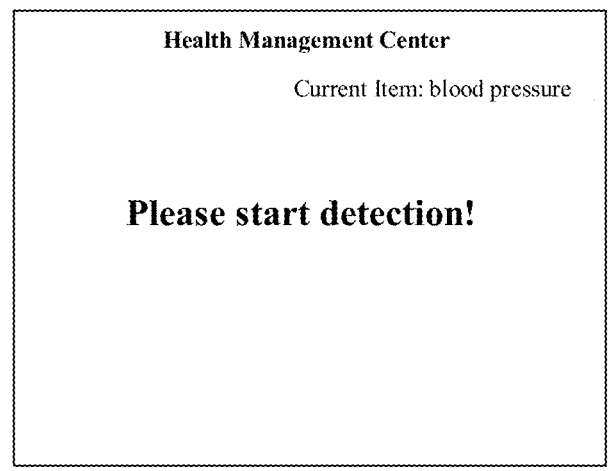
FIG. 2B is a schematic diagram of a user interface of a detection prompt provided by an embodiment of the present disclosure.

FIG. 2A is a schematic diagram of a user interface of pre-detection guide provided by an embodiment of the present disclosure; and FIG. 2B is a schematic diagram of a user interface of a detection prompt provided by an embodiment of the present disclosure.

Referring to FIG. 2A, in at least one embodiment of the present disclosure, after the user terminal successfully binds the first detection device through the first identification information of the first detection device, the detection device administration server may supply the first guidance information of the first detection device to the detection device administration terminal, which may also be referred to as "pre-detection guide". In response to receiving the first guidance information of the first detection device that is sent by the detection device administration server, the detection device administration terminal supplies the first guidance information, that is, the "pre-detection guide" to the user. For example, the detection device administration terminal (e.g., a computer of a health detection workstation, an integrated machine in a health cabin, etc.) may display the first guidance information on the display panel. For example, as shown in FIG. 2A, in response to the user terminal of the current user binding a blood pressure measuring instrument, a certain health management center displays guidance information (i.e., pre-detection guide) of the blood pressure measuring instrument, which may include function description of the blood pressure measuring instrument (e.g., item introduction in FIG. 2A, i.e., "the tunnel sphygmomanometer adopts a pulse wave technology, dual-airbag and dual-sensor design, with convenient and accurate measurement, which is suitable for people of different ages, and able to measure both left and right arms"), or may also include operation description of the blood pressure measuring instrument (e.g., use steps in FIG. 2A, i.e., "1. After turning on, put your arm in the arm tube deeply and place your elbow on the elbow pad; 2. Press the On/Off switch to start detection; and 3. At the end of measurement, after the arm sleeve is automatically released, pull out the arm"), which will not be limited in the embodiment of the present disclosure.

It should be noted that, although the pre-detection guide (the first guidance information) shown in FIG. 2A is presented in a form of image and text, yet in the embodiment of the present disclosure, the detection device administration terminal may also supply the first guidance information to the user in modes such as video or voice, which will not be limited in the embodiment of the present disclosure, and may be set according to actual needs.

For example, in at least one embodiment of the present disclosure, if the first detection device has a display function, the above-described first guidance information may also be displayed on the display panel of the first detection device.

For example, in at least one embodiment of the present disclosure, the above-described first guidance information may also be printed out and presented in a paper form, for example, placed near the corresponding first detection device, or, for another example, pasted on a wall near the first detection device, etc., to facilitate the user to understand a use method of the first detection device, etc.

It should be noted that, a presentation mode of the first guidance information of the first detection device will not be limited in the embodiment of the present disclosure, and may be set according to actual needs.

For example, in at least one embodiment of the present disclosure, after the first detection device receives the first detection request from the detection device administration server in the above-described step S102, when the first detection device is available or ready, it may send a first detection prompt to the detection device administration server. For example, after receiving the first detection prompt, the detection device administration server may send, to the detection device administration terminal, a first prompt request prompting the user to perform the first detection, for example, prompting the user to perform blood pressure detection, etc.

For example, in at least one embodiment of the present disclosure, for example, before the detection device administration terminal receives the first prompt request from the detection device administration server, the detection device administration terminal is displaying the pre-detection guide of the first detection device; and in response to receiving the first prompt request from the detection device administration server, the detection device administration terminal prompts the user to perform the first detection. For example, a display screen of the detection device administration terminal may display words "Please start detection", as shown in FIG. 2B.

For example, in at least one embodiment of the present disclosure, in response to receiving the first prompt request sent by the detection device administration server, the detection device administration terminal may voice broadcast "Please start detection" to prompt the user to perform the first detection.

It should be noted that, a specific mode in which the detection device administration terminal prompts the user to perform detection will not be limited in the embodiment of the present disclosure, and may be set according to actual situations.

Step S103: receiving, after the user completes the first detection, the first detection data sent by the first detection device.

For example, in at least one embodiment of the present disclosure, after the user completes the first detection, the detection device administration server receives the first detection data from the first detection device. For example, in one example, the detection device administration server receives detection data from a blood pressure measuring instrument, for example, the user's systolic blood pressure and diastolic blood pressure measurement values.

For example, in at least one embodiment of the present disclosure, after the user completes the first detection, the user may perform operations such as confirmation on the detection device to complete transmission of the first detection data; or, after completing the detection, the detection device may directly complete transmission of the first detection data without the user's operation.

For example, in at least one embodiment of the present disclosure, after receiving the first detection data from the first detection device, the detection device administration server may automatically process the first detection data, for example, generate the first detection report. For example, the detection device administration server may generate the first detection report based on the first detection data, and according to a predetermined format (e.g., a predetermined table); and the first detection report may be stored in a variety of file formats, for example, text, picture, PDF document, Microsoft Word file format, etc., which will not be limited in the embodiment of the present disclosure. For another example, if necessary, the detection device administration server may add user information to the first detection report to facilitate storage or retrieval. For example, in one example, after the user completes the first detection, the detection device administration server may send a detection completion notification to the detection device administration terminal, or may also send a detection completion notification to the network server, so as to notify the user at the user terminal, for example, the user's mobile phone. For example, the user may choose to view a detection result on the display screen of the detection device administration terminal, or continue other item, for example, the user may also scan a two-dimensional code of a corresponding applet (e.g., "BOE Health Online" Alipay applet) displayed on the display screen of the detection device administration terminal, open the corresponding applet, so as to choose to continue other item in the applet, or view the detection result, etc.

For example, in at least one embodiment of the present disclosure, the detection device administration server may send the first detection data to at least one selected from the group consisting of the detection device administration terminal, the user terminal, and the network server for the user to view. For example, the detection device administration server may send the first detection data and the first detection report generated based on the first detection data to at least one selected from the group consisting of the detection device administration terminal, the user terminal, and the network server. For example, when the user chooses to view the detection result, he/she may view the first detection report on the detection device administration terminal, as shown in FIG. 3A. For example, in an example, the user may also directly print the first detection report on the detection device administration terminal.

For example, in an example, the detection device administration server may send the first detection data and the first detection report together to the network server, so that the network server stores the first detection data and the first detection report. For example, if necessary, the network server may add user information to the first detection report, to facilitate storage or retrieval. For another example, when the network server includes an IoT platform server and a backend server of a certain applet (e.g., the "Healthy Online" applet) installed on the user terminal, the detection device administration server may send the user's detection index data (e.g., the first detection data, etc.) to the IoT platform server, and does not contain user information data (e.g., the user's identity card number, mobile phone number, etc.); the detection device administration server may separately send the user information data directly to the backend server of the applet. For example, the backend server of the applet may obtain the user's detection index data from the IoT platform server, and combine the user information data received from the detection device administration server, thereby protecting the user's privacy. For another example, based on the request, the network server may send the first detection data and the first detection report to the user terminal (e.g., a mobile phone), so that the user may view on an APP, an applet, etc. at a mobile phone terminal.

For example, in at least one embodiment of the present disclosure, after viewing the detection result, the user may choose to abandon the detection result this time and perform detection again; and the detection device administration server may repeat the above-described operations, and no details will be repeated here.

For example, in at least one embodiment of the present disclosure, the user chooses to continue other item. For example, in one example, in response to the user choosing to continue other item, the detection device administration terminal may display a plurality of detection devices other than the first detection device on the display screen, for example, a heart rate measuring instrument, a body composition analyzer, a blood glucose measuring instrument, and a non-invasive blood pressure detection device, etc. In the example, the user may directly click on the display screen of the detection device administration terminal to select a next detection device for detection, that is, a second detection device, according to personal preference. For example, in an example, the detection device administration terminal may display two-dimensional codes corresponding to the plurality of detection devices other than the first detection device on the display screen, and the user may also use the user terminal to scan a two-dimensional code of one of the detection devices, so as to select the second detection device. For another example, in another example, the user may directly come near the next detection device, and use the user terminal to acquire the identification information of the detection device, thereby binding the second detection device.

It should be noted that, a specific mode in which the user selects the second detection device will not be limited in the embodiment of the present disclosure.

For example, in at least one embodiment of the present disclosure, after completing the first detection (e.g., blood pressure detection), in response to the user continuing detection, the user communicates with the second detection device (e.g., a heart rate measuring instrument). For the operation, detailed description of the above-described step S101 may be referred to, and no details will be repeated here.

For example, in at least one embodiment of the present disclosure, in response to the user terminal binding the second detection device (e.g., the heart rate measuring instrument) through second identification information of the second detection device, the second detection request is sent to the second detection device. For the operation, detailed description of the above-described step S102 may be referred to, and no details will be repeated here.

For example, in at least one embodiment of the present disclosure, in response to receiving a second detection prompt from the second detection device, a second prompt request prompting the user to perform second detection is sent. For the operation, detailed description of the above-described embodiment may be referred to, and no details will be repeated here.

For example, in at least one embodiment of the present disclosure, after the user completes the second detection (e.g., heart rate detection), second detection data sent by the second detection device is received. For the operation, detailed description of the above-described step S103 may be referred to, and no details will be repeated here.

For example, in at least one embodiment of the present disclosure, after receiving the second detection data, the detection device administration server may automatically process the second detection data. For example, the detection device administration server may generate a second detection report based on the second detection data.

Figure 3B:
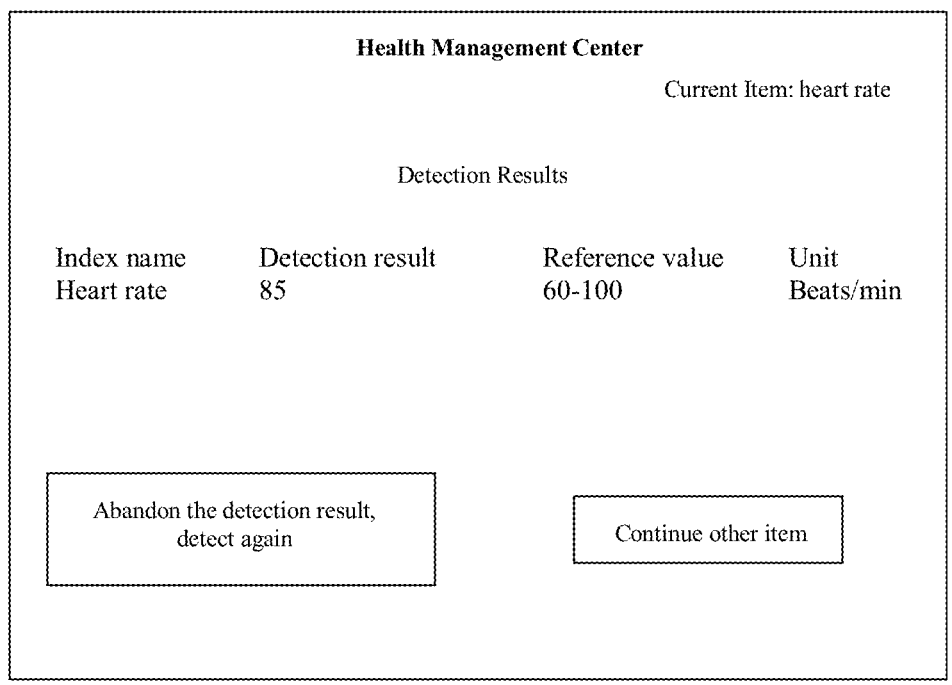
FIG. 3B is a schematic diagram of a user interface of a second detection report provided by an embodiment of the present disclosure.

For example, in at least one embodiment of the present disclosure, the detection device administration server sends the second detection data to at least one selected from the group consisting of the detection device administration terminal, the user terminal, and the network server, for the user to view. For example, in at least one embodiment of the present disclosure, the detection device administration server sends the second detection data and the second detection report generated based on the second detection data together to at least one selected from the group consisting of the detection device administration terminal, the user terminal, and the network server, for the user to view. As shown in FIG. 3B, the detection device administration server sends the second detection data and the second detection report to the detection device administration terminal, thereby displaying the second detection report on the display screen of the detection device administration terminal.

Figure 3C:
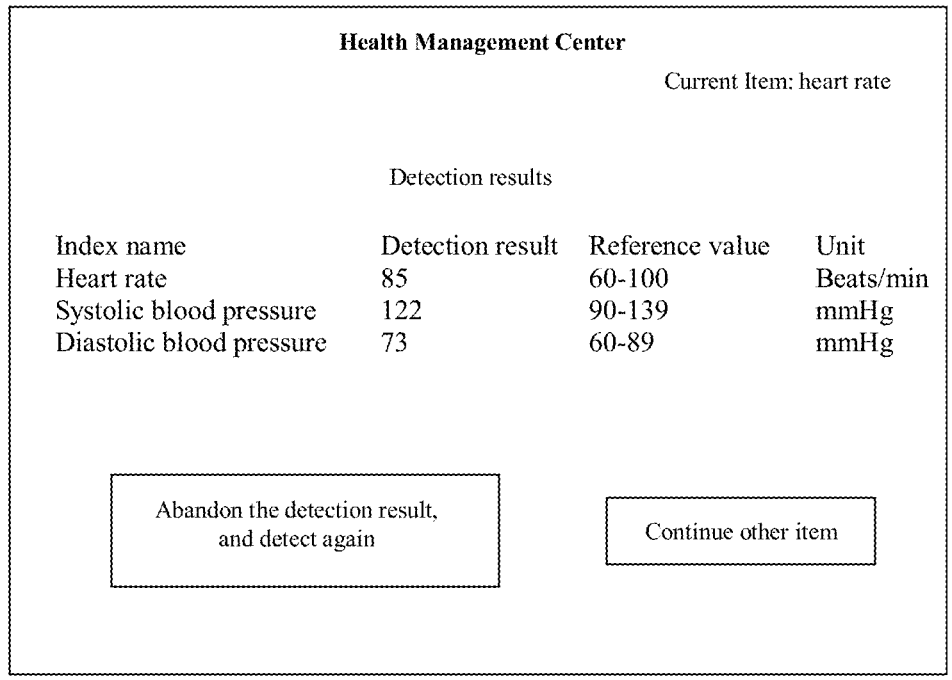
FIG. 3C is a schematic diagram of a user interface of a comprehensive detection report provided by an embodiment of the present disclosure.

For example, in at least one embodiment of the present disclosure, the detection device administration server may send the first detection data and the second detection data in a form of combination detection data to at least one selected from the group consisting of the detection device administration terminal, the user terminal, and the network server, for the user to view. For example, in an example, the detection device administration server may generate a comprehensive detection report based on the first detection data and the second detection data. For example, in at least one embodiment of the present disclosure, the detection device administration server may send the combination detection data and the foregoing comprehensive detection report together to at least one selected from the group consisting of the detection device administration terminal, the user terminal, and the network server, for the user to view. For example, in an example, the detection device administration server sends the comprehensive detection report to the detection device administration terminal, as shown in FIG. 3C, and the comprehensive detection report is displayed on the display screen of the detection device administration terminal. It should be noted that, in some examples, the user may directly print the foregoing first detection report, second detection report, and comprehensive detection report on the detection device administration terminal, to facilitate viewing by the user.

For example, in at least one embodiment of the present disclosure, after the second detection, the user may choose to continue third detection, fourth detection, and so on. That is, the user may repeat the above-described detection operation many times, for which detailed description of the above-described embodiment may be referred to, and no details will be repeated here.

Figure 3D:
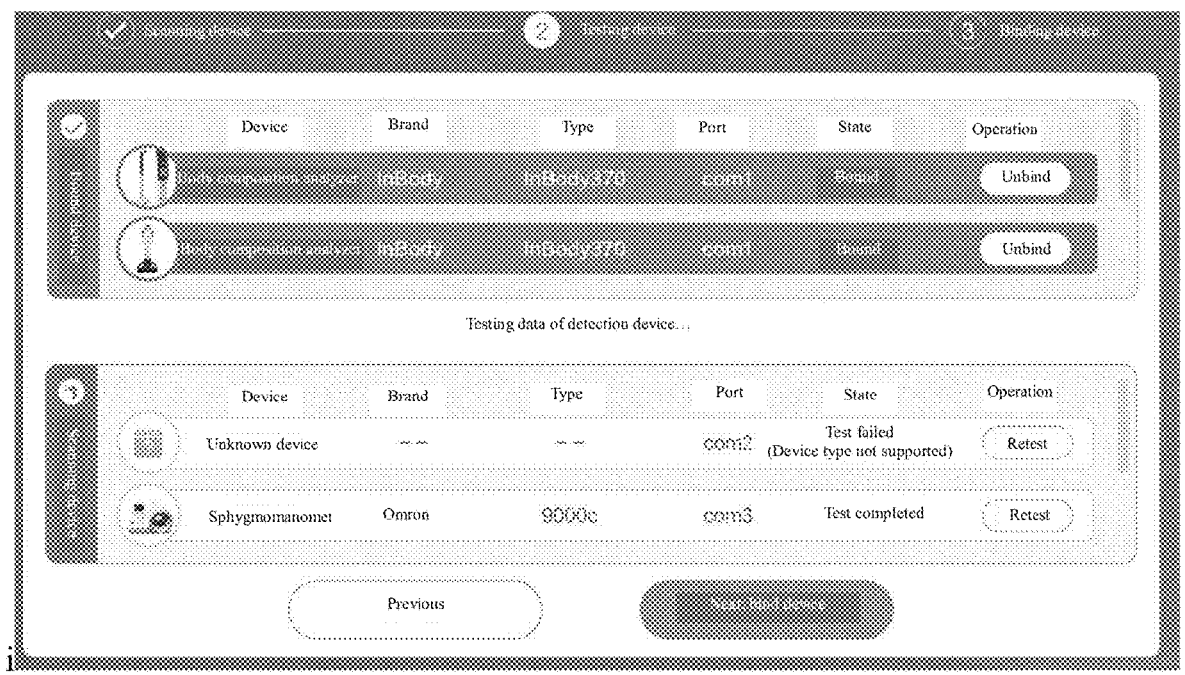
FIG. 3D is a schematic diagram of an administrator interface provided by an embodiment of the present disclosure.

For example, in at least one embodiment of the present disclosure, an administrator may supervise and strengthen operations executed by the detection device administration server through the detection device administration terminal. For example, the administrator may perform an initialization operation, or may also bind and unbind the detection device administration server and respective detection devices, or may also view states of the respective detection devices, as shown in FIG. 3D. For example, in an example, the detection device administration server may scan detection devices, and then perform a data test on a scanned detection device. For example, when an operating state of the detection device is normal and valid, "test completed" is displayed; and when the operating state of the detection device is abnormal and unavailable, "test failed" is displayed. For example, in an example, an operator may click "retest" to refresh the state of the detection device. For another example, in another example, the operator may click "Bind Device" to bind the detection device (e.g., a blood pressure meter in a "Device Scanned" column) in the "test completed" state to the detection device administration serve; the operator may also click "Unbind" to unbind the detection device (e.g., a body composition analyzer in a "Device Bound" column) in the "Bound" state from the detection device administration server.

It should be noted that, the detection device administration server and the detection device may be bound in a one-to-one manner, or may also be bound in a one-to-many manner, which will not be limited in the embodiment of the present disclosure.

It should also be noted that, operations executed by the administrator on the detection device administration terminal will not be limited in the embodiment of the present disclosure, and may be set according to actual situations.

Therefore, the data processing method provided by the embodiment of the present disclosure implements interconnection and intercommunication of respective terminals through interaction between the detection device administration server, the detection device administration terminal, the detection device, the network server, and the user terminal, as well as true, effective, and real-time transmission and integration of the detection data, so that the user can view the detection data conveniently, effectively and in real time, and data loss is not easily caused. Data interconnection and information sharing with a third-party platform (e.g., a medical institution, a public health system, etc.) can also be implemented in a true, effective, and real-time manner, which is favorable for subsequent operations such as data administration.

The data processing method executed on the detection device administration server according to the embodiment of the present disclosure is described above, and a data processing method executed on the detection device administration terminal according to the embodiment of the present disclosure will be further introduced below. The method corresponds to the method according to the foregoing embodiment; for the sake of brevity of the description, only brief description is given below; and for details, the data processing method according to the foregoing embodiment may be referred to.

Figure 4A:
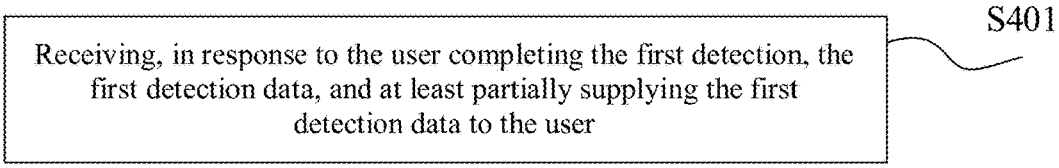
FIG. 4A is a flow chart of a data processing method applicable to a detection device administration terminal provided by an embodiment of the present disclosure.
Figure 7:
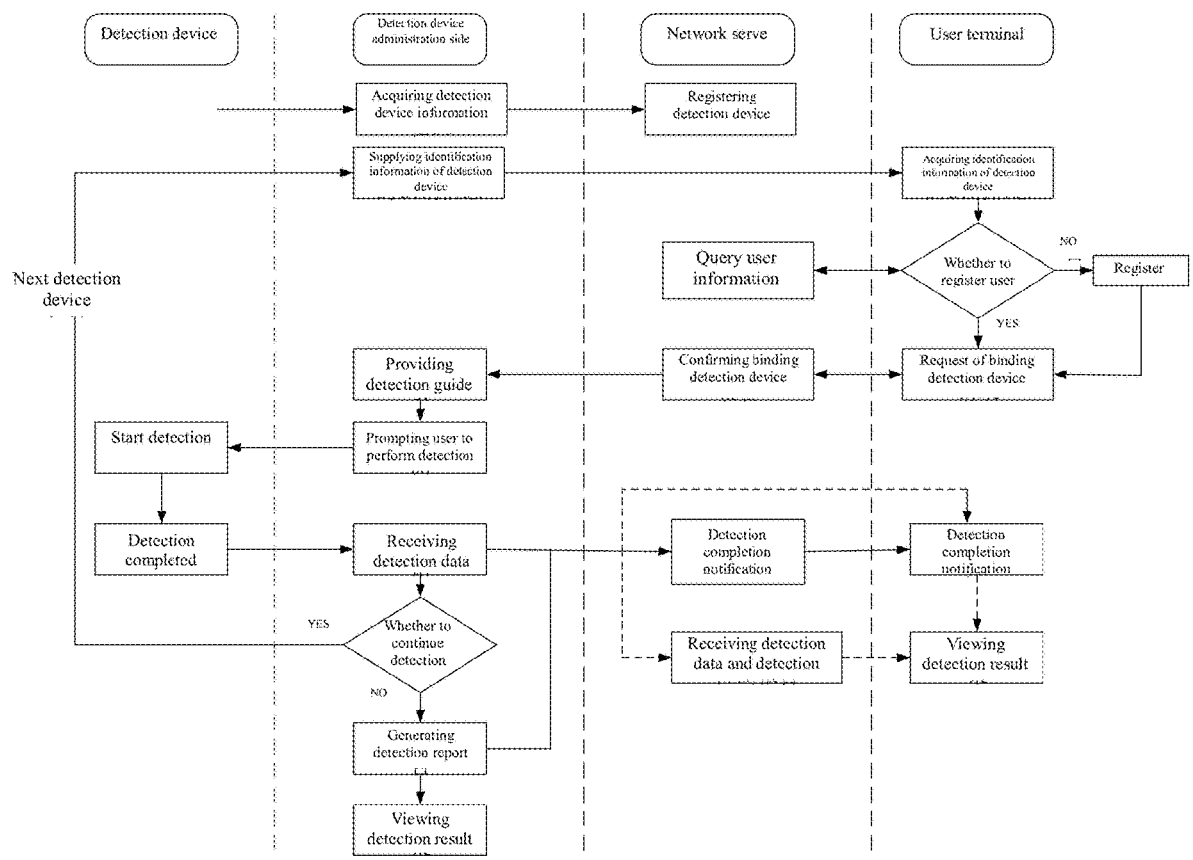
FIG. 7 is a schematic logic flow block diagram of a data processing method provided by an embodiment of the present disclosure.

FIG. 4A is a flow chart of a data processing method 40 applicable to a detection device administration terminal provided by an embodiment of the present disclosure. Referring to FIG. 4A and FIG. 7, the data processing method 40 applicable to the detection device administration terminal includes operations below:

Step S401: receiving, in response to the user completing the first detection, the first detection data, and at least partially supplying the first detection data to the user.

For example, in the embodiment of the present disclosure, in response to receiving the first prompt request sent by the detection device administration server, the detection device administration terminal may prompt the user to perform the first detection by displaying text images, video animations, and by voice broadcasting, etc. For example, the display screen of the detection device administration terminal may display the words "Please start detection", as shown in FIG. 2B. For example, in at least one embodiment of the present disclosure, in response to receiving the first prompt request sent by the detection device administration server, the detection device administration terminal may voice broadcast "Please start detection" to prompt the user to perform the first detection.

It should be noted that a specific mode in which the detection device administration terminal prompts the user to perform detection will not be limited in the embodiment of the present disclosure and may be set according to actual situations.

For example, in at least one embodiment of the present disclosure, in response to the user completing the first detection, the detection device administration terminal may receive the first detection data from the detection device administration server, and at least partially supply the first detection data to the user. For example, in an example, after the user completes the first detection, the detection device administration server may send a detection completion notification to the detection device administration terminal; and the user may choose to view the detection result on the display screen of the detection device administration terminal, or continue other item. For example, when the user chooses to view the detection result, he/she may view the first detection report generated based on the first detection data on the detection device administration terminal, as shown in FIG. 3A. For example, in an example, the user may also directly print the first detection report on the detection device administration terminal.

For example, in the embodiment of the present disclosure, the data processing method 40 applicable to the detection device administration terminal may further include: supplying, in response to receiving the first guidance information of the first detection device that is sent by the detection device administration server, the first guidance information to the user. For example, the detection device administration terminal may supply the first guidance information to the user by displaying text images, video animations, and by voice broadcasting, etc., which will not be limited in the embodiment of the present disclosure. For description of the operation, related description of FIG. 2A above may be referred to, and no details will be repeated here.

For example, in the embodiment of the present disclosure, the data processing method 40 applicable to the detection device administration terminal may further include: supplying, in response to receiving the first identification information of the first detection device that is sent by the detection device administration server, the first identification information to the user. For example, the detection device administration terminal may supply the first identification information to the user in various modes, for example, displaying an electronic two-dimensional code, and a password, etc. corresponding to the first detection device on the display panel thereof, or may also by voice broadcasting a digital password corresponding to the first detection device, etc., which will not be limited in the embodiment of the present disclosure.

For example, in the embodiment of the present disclosure, the data processing method 40 applicable to the detection device administration terminal may further include: prompting, after the user completes the first detection, in response to receiving a second prompt request prompting the user to perform the second detection that is sent by the detection device administration server, the user to perform the second detection. For description of the operation, related description of the above-described embodiment may be referred to, and no details will be repeated here.

For example, in an embodiment of the present disclosure, in response to the user completing the second detection, the detection device administration terminal may receive the second detection data, and at least partially supply the second detection data to the user. For description of the operation, related description of step S401 and FIG. 3B may be referred to, and no details will be repeated here.

For example, in the embodiment of the present disclosure, in response to the user completing the second detection, the combination detection data based on the first detection data and the second detection data are received, and the combination detection data is at least partially supplied to the user. For example, as described above, the detection device administration server may generate the comprehensive detection report based on the first detection data and the second detection data, and send the comprehensive detection report to the detection device administration terminal; and then the comprehensive detection report may be displayed on the display screen of the detection device administration terminal. For example, the user may also directly print the first detection report, the second detection report, and the comprehensive detection report on the detection device administration terminal, to facilitate viewing. For description of the operation, related description of FIG. 3C above may be referred to, and no details will be repeated here.

It should be noted that, the user may choose to view a detection report of a single detection item according to needs, or may choose to view a comprehensive detection report that integrates all detection items, or may also choose to view a detection report that integrates some detection items, which will not be specifically limited in the embodiment of the present disclosure.

For example, in the embodiment of the present disclosure, the detection device administration terminal may acquire the user's identity information to judge whether the user is a registered user. For example, the detection device administration terminal may acquire the user's face information, iris information, fingerprint information, identity card information, etc., in order to judge whether the user has been registered. For example, in an example, when the user is not a registered user, a content that guides the user to register may be displayed on the detection device administration terminal; for example, the detection device administration terminal guide the user to register by means of video, image, text, etc.; and it should be noted that, this will not be limited in the embodiment of the present disclosure.

For example, in an example, after the user logs in to the system, four types of service may be displayed on the detection device administration terminal for the user to select: health assessment, health detection, report printing, and health consultation. For example, the user may click to select health detection, so as to execute the above-described detection operation. For example, in an example, during health detection, the detection device administration terminal may display prompts such as pre-detection executing, detecting, detection interrupting, detection completed, detection result, etc. according to actual situations, so as to inform the user of a detection state. It should be noted that, this will not be limited in the embodiment of the present disclosure.

The data processing method executed on the detection device administration terminal according to the embodiment of the present disclosure is described above, and a data processing method executed on a user terminal according to an embodiment of the present disclosure will be further introduced below. The method corresponds to the method according to the foregoing embodiment; for the sake of brevity of the description, only brief description is given below; and for details, the data processing method according to the foregoing embodiment may be referred to.

Figure 4B:
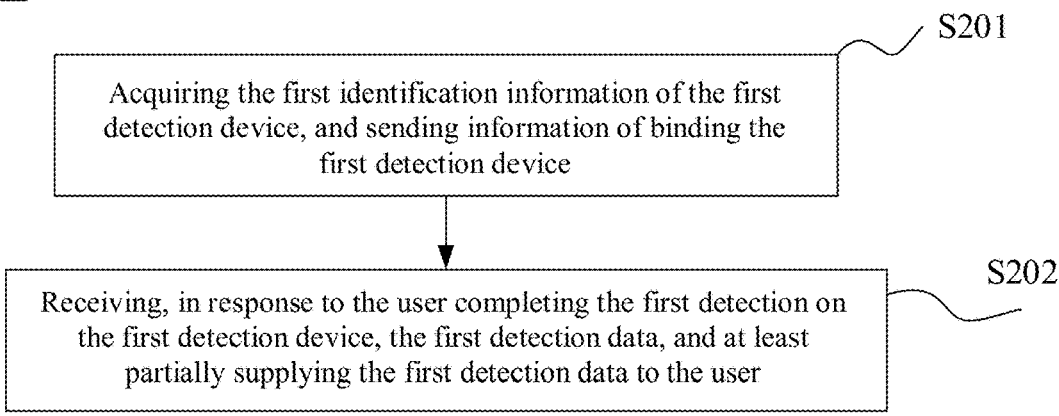
FIG. 4B is a flow chart of a data processing method applicable to a user terminal provided by an embodiment of the present disclosure.

FIG. 4B is a flow chart of a data processing method 20 applicable to a user terminal provided by an embodiment of the present disclosure. Referring to FIG. 4B and FIG. 7, the data processing method 20 applicable to the user terminal includes operations below:

Step S201: acquiring the first identification information of the first detection device, and sending information of binding the first detection device;

Step S202: receiving, in response to the user completing the first detection on the first detection device, the first detection data, and at least partially supplying the first detection data to the user.

It should be noted that, when implementing the data processing method 20 applicable to the user terminal provided by at least one embodiment of the present disclosure, some steps in step S201 to step S202 may be selectively executed, and some additional steps other than step S201 to step S202 may also be executed, which will not be specifically limited in the embodiment of the present disclosure.

In step S201, the first identification information of the first detection device is acquired, and the information of binding the first detection device is sent.

For example, in at least one embodiment of the present disclosure, the user may use an applet or an APP on the mobile phone to scan the two-dimensional code of the first detection device that is displayed on the display panel of the detection device administration terminal, and then send the information of binding the first detection device to the network server, or receive the first identification information of the first detection device input by the user himself/herself. For example, in at least one embodiment of the present disclosure, the user may input a corresponding password of the first detection device on the applet or the APP on the mobile phone, and then send the information of binding the first detection device to the network server.

For example, in at least one embodiment of the present disclosure, the information of binding the first detection device that is sent by the user terminal to the network server may contain a binding request, a device number of the first detection device, user information (e.g., user ID), etc., which will not be limited in embodiment of the present disclosure.

In step S202, in response to the user completing the first detection on the first detection device, the first detection data is received, and the first detection data is at least partially supplied to the user.

For example, in at least one embodiment of the present disclosure, after the user completes the first detection on the first detection device, the user terminal may receive the detection completion notification from the network server, and receive the first detection data from the network server, or may also receive the first detection data and the first detection report generated based on the first detection data from the network server, so as to facilitate the user to view the detection result. After the user completes the first detection on the first detection device, the user terminal may receive, from the detection device administration server or the network server, information of completing the first detection, and then notify the user through text or voice, so that the user may choose whether to view the detection result.

Figure 5A:
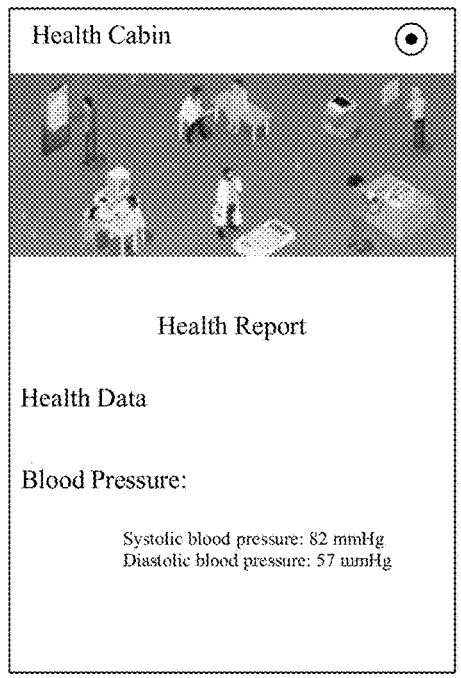
FIG. 5A is a schematic diagram of a first type of user interface that at least partially supplies a first detection report at a user terminal provided by an embodiment of the present disclosure.
Figure 5B:
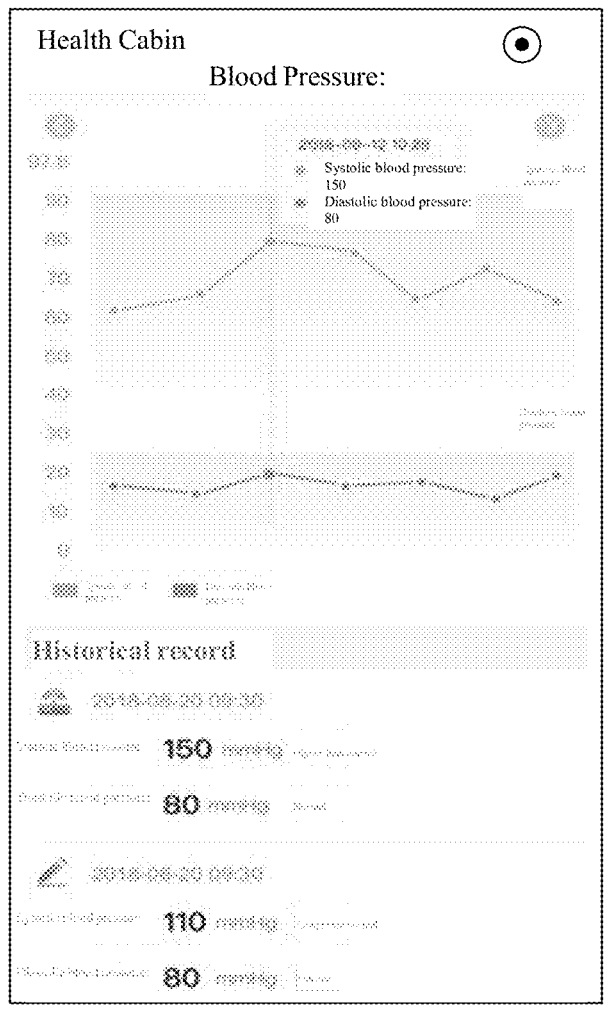
FIG. 5B is a schematic diagram of a second type of user interface that at least partially supplies a first detection report at a user terminal provided by an embodiment of the present disclosure.
Figure 5C:
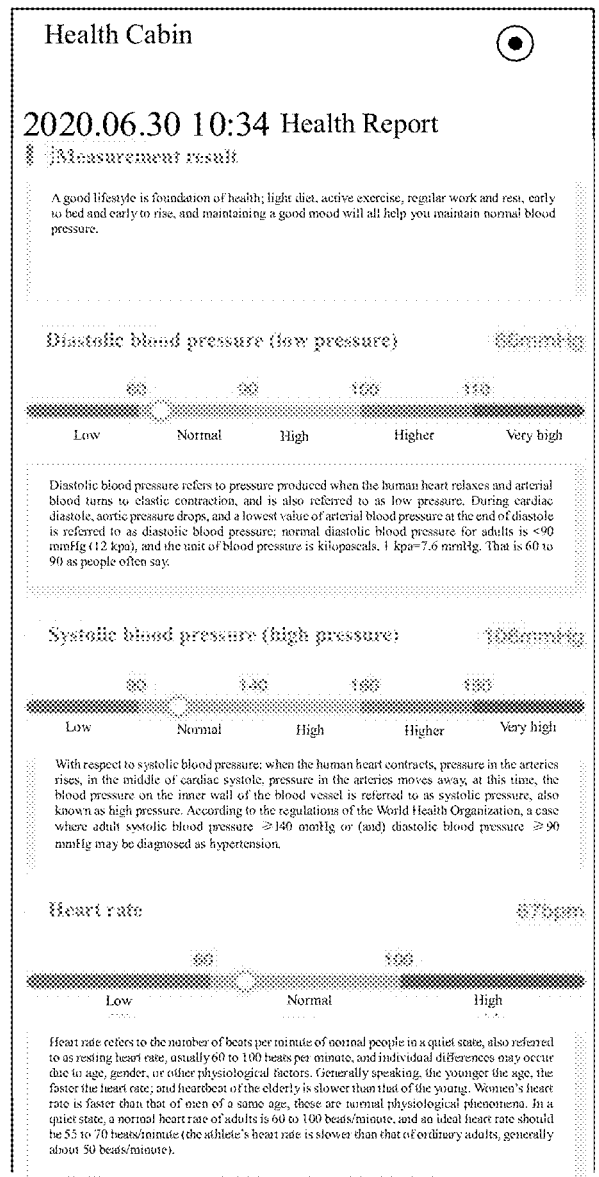
FIG. 5C is a schematic diagram of a third type of user interface that at least partially supplies a first detection report at a user terminal provided by an embodiment of the present disclosure.

For example, in at least one embodiment of the present disclosure, after receiving the first detection data, the user terminal may at least partially supply the first detection data to the user. For example, in one example, the "Healthy Online" applet on the user terminal may display the detection result to the user in various modes. For example, the user terminal may only digitally display a current measurement value of a current detection item (e.g., blood pressure), as shown in FIG. 5A. For example, the user terminal may display a detection result of the current detection item (e.g., blood pressure) with a line graph, and supply historical detection data to the user, as shown in FIG. 5B. For example, the user terminal may display detection results of detection items (e.g., blood pressure, heart rate, etc.) with a bar graph, and give text analysis based on the measurement results, as shown in FIG. 5C.

For example, in an example, in response to the user completing the first detection on the first detection device (e.g., a blood pressure meter), the first detection data is received; for example, the first detection data contains the user's systolic blood pressure and diastolic blood pressure measurement values. When the user only wants to view a result of systolic blood pressure, only the value of the systolic blood pressure is supplied to the user, that is, only part of the detection data is supplied to the user.

It should be noted that, a mode in which the user terminal at least partially supplies the detection report to the user will not be limited in the embodiment of the present disclosure.

For example, in at least one embodiment of the present disclosure, after the user completes the first detection, in response to the user continuing the detection, the second identification information of the second detection device is acquired, and the information of binding the second detection device is sent. For the operation, detailed description of step S201 may be referred to, and no details will be repeated here.

For example, in at least one embodiment of the present disclosure, in response to the user completing the second detection on the second detection device, the second detection data is received, and the second detection data is at least partially supplied to the user. For the operation, description of step S202 may be referred to, and no details will be repeated here.

For example, in at least one embodiment of the present disclosure, in response to the user completing the second detection, the combination detection data based on the first detection data and the second detection data is received, and the combination detection data is at least partially supplied to the user.

For example, in an example, the first detection device is a blood pressure measuring instrument, and the second detection device is a heart rate measuring instrument, then the above-described comprehensive detection report may be, for example, as shown in FIG. 5C. After the user completes the second detection, the user may choose to receive the first detection report, the second detection report, or the comprehensive detection report, for example, on the user interface displayed by the applet or the APP of the user terminal, and the corresponding detection report may be at least partially supplied to the user.

For example, in at least one embodiment of the present disclosure, before the user terminal sends the information of binding the first detection device, the method further includes acquiring the user's identity information, to verify the user. For example, the user's identity information includes at least one selected from the group consisting of user's identity document information, user's electronic identity information, and a user's biometric feature.

For example, in an example, the user may log in to a program running on the user terminal, or log in to the above-described detection device administration server (e.g., a health management center, a health service center system, etc.) through the ID number or the ID card. For example, the user may also log in to the above-described detection device administration server by scanning a health code. For example, in another example, the user may log in to the above-described detection device administration server through an applet (e.g., an Alipay applet, a WeChat applet, etc.) or an APP on a mobile phone. For another example, in an example, the user may log in to the above-described detection device administration server through fingerprint recognition, iris recognition, facial recognition, etc., which will not be limited in the embodiment of the present disclosure.

For example, in at least one embodiment of the present disclosure, when the user uses the above-described health management center or workstation system for a first time, he/she needs to register identity information on the user terminal firstly, for user verification during subsequent login.

Hereinafter, a data processing method in a network server according to an embodiment of the present disclosure will be further introduced. The method corresponds to the method according to the foregoing plurality of embodiments; for the sake of brevity of the description, only brief description is given below; and for details, the data processing method according to the foregoing plurality of embodiments may be referred to.

Figure 6:
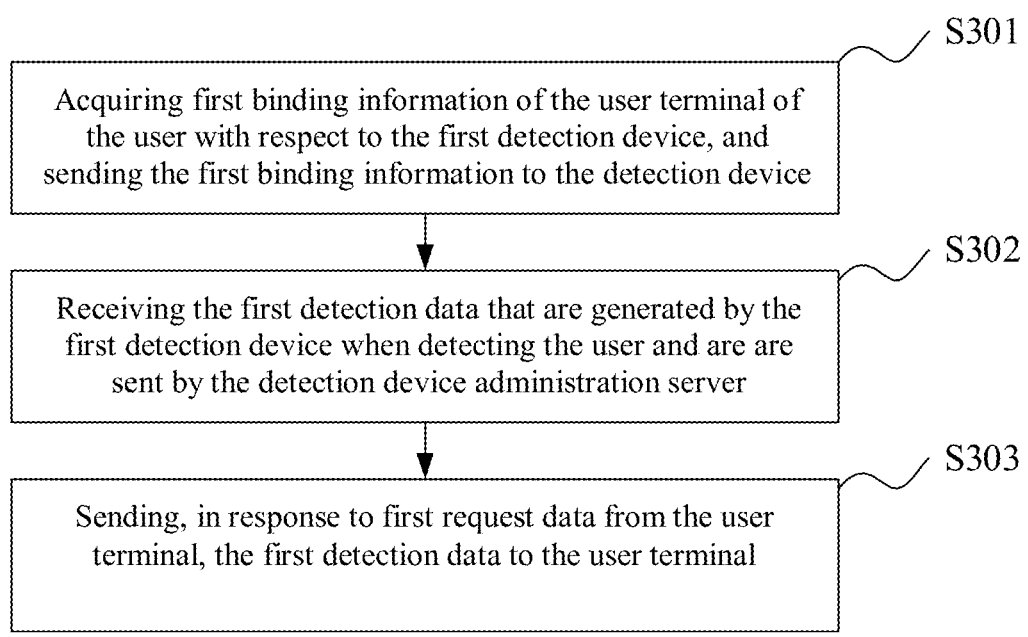
FIG. 6 is a flow chart of a data processing method applicable to a network server provided by an embodiment of the present disclosure.

FIG. 6 is a flow chart of a data processing method 30 applicable to a network server provided by an embodiment of the present disclosure. Referring to FIG. 6 and FIG. 7, the data processing method 30 applicable to the network server includes operations below:

Step S301: acquiring first binding information of the user terminal of the user with respect to the first detection device, and sending the first binding information to the detection device administration server;

Step S302: receiving the first detection data that are generated by the first detection device when detecting the user and are sent by the detection device administration server;

Step S303: sending, in response to first request data from the user terminal, the first detection data to the user terminal.

It should be noted that, for implementing the data processing method 30 applicable to the user terminal provided by at least one embodiment of the present disclosure, some steps in step S301 to step S303 may be selectively executed, or some additional steps other than step S301 to step S303 may also be executed, which will not be limited in the embodiment of the present disclosure.

In step S301, the first binding information of the user terminal of the user with respect to the first detection device is acquired, and the first binding information is sent to the detection device administration server.

For example, in at least one embodiment of the present disclosure, the first binding information of the user terminal with respect to the first detection device may contain the device number of the first detection device, the user information (e.g., the user ID), etc. which will not be limited in embodiment of the present disclosure. For example, in an example, the network server may verify whether the first detection device is qualified, for example, judge whether a current operating state of the first detection device is normal, for example, the network server may send a query request to the detection device administration server, and the detection device administration server queries the current operating state of the first detection device and then feeds back relevant information to the network server; and then the network server determines to confirm the binding request of the user terminal with respect to the first detection device. When the network server determines that the operating state of the first detection device is abnormal or is in an unavailable state, it may send a notification to the user terminal, so that the user may timely replace the detection device. For example, in an example, the network server may also verify the identity of the user, for example, the network server may judge whether the current user has been registered after querying the user information. When the network server determines that the current user is a new user, it may send a notification to the user terminal to remind the user to register an account at the user terminal, etc. For example, in at least one embodiment of the present disclosure, after the network server determines that the first detection device is valid and the user is a registered user, it may determine to bind the first detection device, and send the first binding information to the detection device administration server.

For example, in a case where the network server includes an IoT platform server and a backend server of a certain applet (e.g., the "Healthy Online" applet) installed on a user terminal, operations such as registering the detection device, querying the operating state of the detection device, and binding the user account and the detection device, etc. may be executed on the IoT platform server; and operations such as querying the user information and judging whether the user has been registered, etc. may be executed on the backend server of the applet.

It should be noted that, the network server may also include other business-specific servers, which will not be limited in the embodiment of the present disclosure.

In step S302, the first detection data that are generated by the first detection device when detecting the user and are sent by the detection device administration server is received. For the operation, the above-described related embodiments may be referred to, and no details will be repeated here. For example, in an example, the network server may also receive the first detection data that are generated by the first detection device when detecting the user and are sent by the detection device administration server and the first detection report generated based on the first detection data. For the operation, the above-described related embodiments may be referred to, and no details will be repeated here.

In step S303, in response to the first request data from the user terminal, the first detection data is sent to the user terminal. For example, in an example, if the user chooses to view the detection result at the user terminal, the user terminal may send the first request data to the network server. After receiving the first request data from the user terminal, the network server sends the first detection data to the user terminal. For example, the first request data may contain the user ID, the device number of the detection device corresponding to the item that the user wants to view, etc., which will not be limited in the embodiment of the present disclosure.

For example, in at least one embodiment of the present disclosure, the network server may receive registration information of the first detection device from the detection device administration server; and in response to receiving the registration information of the first detection device, the network server registers the first detection device.

For example, in at least one embodiment of the present disclosure, when the user chooses to continue the detection, the second binding information of the user terminal with respect to the second detection device is acquired, and the second binding information is sent to the detection device administration server. For the operation, description of step S301 may be referred to, and no details will be repeated here.

For example, in at least one embodiment of the present disclosure, at least one selected from the group consisting of the second detection data that are generated by the second detection device when detecting the user and are sent by the detection device administration server and the combination detection data based on the first detection data and the second detection data is received. For the operation, description of step S302 may be referred to, and no details will be repeated here.

For example, in at least one embodiment of the present disclosure, in response to the second request data from the user terminal, at least one selected from the group consisting of the second detection data and the combination detection data is sent to the user terminal. For the operation, the above-described related embodiments may be referred to, and no details will be repeated here.

For example, in at least one embodiment of the present disclosure, the network server may be a backend server of a certain applet (e.g., a health online applet) installed on the user terminal, and the above-described operations S301 to S303 disclosed in the embodiment of the present disclosure may be executed on the backend server of the applet.

For example, in at least one embodiment of the present disclosure, a network server may also include an IoT platform server and a user terminal backend server (e.g., the above-described applet backend server). For example, the IoT platform server may be configured to: acquire the first binding information of a user terminal with respect to a first detection device, and send the first binding information to a detection device administration server. For example, the user terminal backend server is configured to: receive first detection data that are generated by the first detection device when detecting a user and are sent by the detection device administration server, and to send, in response to the first request data from the user terminal, the first detection data to user terminal. In other words, the IoT platform server in the network server may execute the above-described operation S301, and the user terminal backend server in the network server may execute the above-described operations S302 and S303.

It should be noted that, in the embodiment of the present disclosure, the IoT platform server in the network server may execute other operations in addition to the above-described operation S301, and the user terminal backend server in the network server may execute other operations in addition to the above-described operations S302 and S303; besides, the network server may also include other various servers for different businesses, which will not be limited in the embodiment of the present disclosure.

FIG. 7 is a schematic logic flow block diagram of a data processing method provided by an embodiment of the present disclosure. Referring to FIG. 7, one or more detection devices are in signal connection with the detection device administration server; the detection device administration server is in signal connection with the detection device administration service terminal; the detection device administration server is in signal connection with the user terminal; the network server is in signal connection with the detection device administration server; and the network server is also in signal connection with the user terminal.

It should be noted that, for clarity and conciseness, in a second lane in FIG. 7, a detection device administration side includes the foregoing detection device administration server and the foregoing detection device administration terminal, that is to say, operations shown in the second lane include operations executed by the detection device administration server and operations executed by the detection device administration terminal. For various operations of the detection device, various operations of the detection device administration server, various operations of the detection device administration terminal, various operations of the network server, and various operations of the user terminal shown in FIG. 7, description of the data processing methods 10 to 40 may be referred to, and no details will be repeated here. A dotted line in FIG. 7 represents an alternative mode in addition to that represented by a solid line. For example, the user may choose to view the detection result on the detection device administration terminal, or view the detection result on the user terminal.

For example, as shown in FIG. 11, at least one embodiment of the present disclosure provides a data processing system. The data processing system includes: a detection device administration server 720, a detection device administration terminal 750, a network server 740, and a user terminal 730. For example, the user terminal 730 is configured to: acquire first identification information of a first detection device 710, and send information of binding the first detection device. For example, the network server 740 is configured to: acquire the first binding information of the user terminal 730 with respect to the first detection device 710, and send the first binding information to the detection device administration server 720. For example, the detection device administration server 720 is configured to: communicate with the first detection device 710, and send, in response to the user terminal 730 of the user binding the first detection device 710 through the first identification information of the first detection device 710, a first detection request to the first detection device 710. The detection device administration server 720 is further configured to: receive, after the user completes the first detection, first detection data sent by the first detection device 710. The detection device administration terminal 750 is configured to: receive, in response to the user completing first detection, the first detection data, and at least partially supply the first detection data to the user. The network server 740 is configured to: receive, in response to the user completing the first detection, the first detection data, and send, in response to the first request data from the user terminal 730, the first detection data to the user terminal 730. The user terminal 730 is further configured to: receive, in response to the user completing the first detection, the first detection data, and at least partially supply the first detection data to the user.

Figure 8:
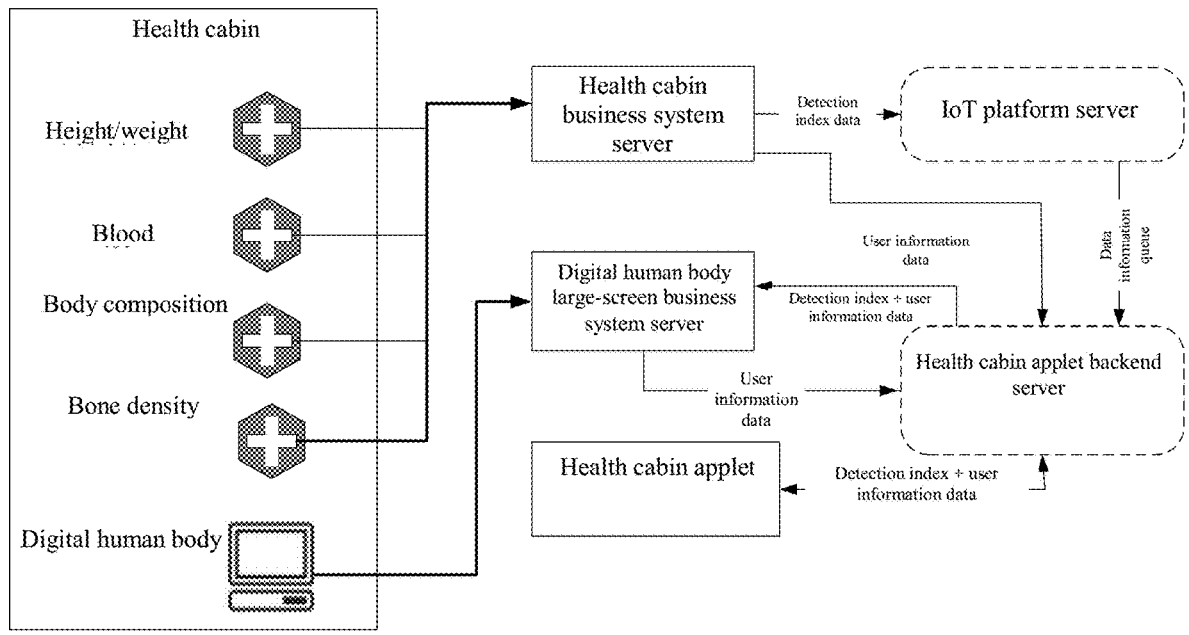
FIG. 8 is a system architecture diagram of a health service center system provided by an embodiment of the present disclosure.

FIG. 8 is a system architecture diagram of a health service center system provided by an embodiment of the present disclosure. Referring to FIG. 8, for example, in a certain health service center system, a user uses a detection device (e.g., a height and weight detection device, a non-invasive blood test instrument, a body composition detection device, etc.) in an offline health cabin for health detection. For example, according to the data processing method provided by the embodiment of the present disclosure, detection data obtained after detection of the user at the health cabin may be sent to a health cabin business system server (i.e., the detection device administration server according to the above-described embodiment). The detection data may be sent by the health cabin business system server to an IoT platform server and a health cabin applet backend server; specifically, the IoT platform server and the health cabin applet backend server may be mutually independent servers deployed in a cloud server, and data interaction may be performed between the two (e.g., the two constitute the network server according to the above-described embodiment).

For example, in an example, the health cabin applet backend server may be configured to perform interaction may also be provided to develop a plurality of businesses for different needs to perform data interaction with the IoT platform and send data to a corresponding user terminal, which will not be limited in the embodiment of the present disclosure.

For example, in one example, the IoT platform server may be configured to administrate device information of an IoT health monitoring device, health data sent, bound user account, and health data of respective user accounts. Specifically, the IoT platform server is mainly responsible for functions such as manufacturers, products, devices, system administration, indexes and device access, data administration, data processing, data analysis, and data distribution.

For example, as shown in FIG. 8, the health cabin business system server may send the user's detection index data (e.g., the first detection data and the first detection report, etc.) to the IoT platform server, and the health cabin business system server may separately send the user information data (e.g., the user's ID number, mobile phone number and other user private information) to the health cabin applet backend server. For example, the health cabin applet backend server may acquire the user's data information queue from the IoT platform server; for example, the data information queue may contain detection index data, and other data integrated on the IoT platform, etc., which, after being combined with the user information data received from the health cabin business system server, is sent together to the health cabin applet installed on the user terminal, thereby protecting privacy of the user.

For example, functions that the IoT platform server may implement are as listed in numbers 1 to 9 in Table 1 below, and functions that the health cabin business system server may implement are as listed in numbers 10 to 12 in Table 1 below. Specific functions will be described in detail below in conjunction with other components included in the health service center system.

TABLE 1

| No. | Function points | Function description |
| --- | --- | --- |
| 1 | Manufacturer administration | Administrate manufacturer information to facilitate association of products, devices and related certifications, etc. |
| 2 | Product administration | Product information, including product attributes, data, interface format, etc. |
| 3 | Device administration | Device, i.e., product instance, which refers to a device specifically accessed to the system, including device state, life cycle, data access, interaction, etc. |
| 4 | Index administration | Maintain relevant index information. |
| 5 | System/application administration | Maintain system and application information that interact with the platform. |
| 6 | Device access | Access different devices. |
| 7 | Data processing | Data standardization processing, which is not limited to data association, index data standardization, etc. |
| 8 | Data analysis | Perform data mining and visual analysis. |
| 9 | Data distribution | Push data to other systems, according to different system requirements. |
| 10 | Applet | Include personal information maintenance, device binding, data viewing, etc. |
| 11 | Administration terminal | Basic functions such as device, data, personal administration, user and permissions. |
| 12 | News push | News push. | and news push respectively with the health cabin business system server (i.e., the detection device administration server according to the above-described embodiment) and the user terminal, an applet end, a digital human body large-screen business terminal, etc. Of course, in the embodiment of the present disclosure, other business server For example, in an example, the health service center system may also include a digital human body terminal, for example, a digital human body large-screen business terminal. For example, as shown in FIG. 8, the digital human body large-screen business server is in signal connection with the digital human body terminal placed in the offline health cabin; the digital human body large-screen business server may receive user information data input by the user on the digital human body terminal; based on the user information data, the user's detection index data, user information data and other data may be acquired from the health cabin applet backend server; these items of user data are detected, analyzed and integrated to construct a visualized human-body life data system, by using 3D modeling and other technologies, and are at least partially supplied to the user in a form of 3D digital human body, for example, displayed on the digital human body terminal (e.g., the digital human body large-screen terminal).

For example, in the above-described health service center system provided by the embodiment of the present disclosure, the network server not only includes the IoT platform server and the health cabin applet backend server shown in FIG. 8, but may also include different business system servers for different businesses; the different business system servers may establish communication with different types of terminals, that is, may develop a variety of business system servers for different needs to respectively perform data interaction with the IoT platform server. For example, the IoT platform server and the business system server are mutually independent servers deployed on the cloud server, and data interaction may be performed between the two.

For example, in the embodiment of the present disclosure, the health service center system may further include a monitoring administration terminal. The monitoring administration terminal may perform device administration and resident health administration. For example, in one example, an operator may hold a monitoring administration terminal, and can effectively administrate an IoT health monitoring device; for example, as a company sales administrator, he/she may record warehousing information of a sold IoT health monitoring device and information of allocation to a relevant institution in his/her own monitoring administration terminal, so that device information of the IoT health monitoring device may be stored to the IoT platform server for unified administration. As a renter or device seller, he/she may actively bind or unbind an IoT health monitoring device with a certain user.

For example, in one example, the IoT platform server may analyze health data of respective user accounts, to generate health record information of the respective user accounts; and the monitoring administration terminal is configured to receive and display the health record information sent by the business system server. For example, the IoT platform server may analyze the health data of the respective user accounts, and establish resident health record information for medically qualified personnel such as a health management physician, so that the personnel may administrate the resident health data in a region where he/she is located. Specifically, according to the respective items of resident health data aggregated, and with the user accounts as a dimension, the IoT platform server forms health records, including data trend graphs, historical data, disease history, basic physiological parameters, etc., which are displayed in a system interface of the monitoring administration terminal, to facilitate the physician to administrate the resident health data.

For example, in an example, the IoT platform server may be configured to generate corresponding push messages with user accounts of abnormal health data; the monitoring administration terminal may be configured to receive and display the push messages sent by the business system server. Specifically, the IoT platform server may judge the user's chronic disease development trend through intelligent analysis, put trend-abnormal resident information on top of the display interface, and actively push to a chronic disease management physician. After the chronic disease management physician logs into a system interface in the monitoring administration terminal, he/she will acquire the abnormal resident information in the first place, and check a health record thereof, for an operation of return visit, etc.

For example, in the embodiment of the present disclosure, the health service center system may further include: a health data platform terminal, for example, a health data perspective platform. For example, the IoT platform server may be configured to perform data mining and visual analysis on health data of respective user accounts, to generate visualized resident health data; and the health data perspective platform terminal is configured to receive and display the visualized resident health data sent by the business system server. It should be noted that, in the embodiment of the present disclosure, the term "visualization" refers to visual expression of abstract concepts, that is to say, the visualized data herein refers to that the data is taken as an object, and displayed in a more intuitive way, for example, it may be displayed through various charts, animations, etc., which will not be limited in the embodiment of the present disclosure.

For example, in an example, the IoT platform server may perform data mining and visual analysis on recorded situations of the IoT health monitoring device, the resident health data, etc., and visualize on a screen of the health data perspective platform terminal, to intuitively display situations of health management and development in the community or region, and assist in establishing regional chronic disease prevention and control programs. For example, the visualized data that may be implemented by the IoT platform server may include:

1) The total number of residents in the region;
2) Statistical charts of the number of patients with various chronic diseases in the region, for example, statistical charts of the number of hypertensive patients, statistical charts of the number of diabetic patients, etc.;
3) Statistical charts of use situations of various home IoT health monitoring devices: statistical charts obtained by analyzing dimensions such as age, gender, and device category;
4) Statistical charts of the daily number of abnormal residents in monitored health data;
5) Trend charts and forecast trend charts of the number of patients with various chronic diseases;
6) User health status statistic charts: statistic charts obtained by analyzing dimensions such as disease history and surgical history.

For example, in the embodiment of the present disclosure, the health service center system may further include: a standard data interface, configured to establish a data interaction channel between other business system servers and third-party servers. Through data interaction of the standard data interface, the resident health information, medical information, etc. may be effectively combined with home chronic disease data to form a multi-dimensional health record, so as to facilitate health management.

For example, in the embodiment of the present disclosure, the third-party server may specifically include: one or a combination of a Hospital Information System (HIS) server and a public health administration system server.

Therefore, the health service center system provided by the embodiment of the present disclosure may also use the IoT technology to connect a mobile health monitoring, portable/home multi-parameter physiological monitoring device, i.e., an IoT health monitoring device with an IoT platform, a business system, a large-screen data display terminal, a HIS, a public health system and a user intelligent terminal, so as to implement interconnection and intercommunication of respective terminals, as well as true, effective and real-time transmission and integration of monitoring data; at a same time, with the help of advanced computer network technology, personal basic information and health information are digitally collected, transmitted electronically, stored on the IoT platform, which, in combination with data information and resident medical information, etc. collected by the IoT health monitoring device, form a multi-dimensional resident health record. Meanwhile, the user health record data is automatically analyzed and intelligently judged, and abnormality is prompted at the business system, so that a doctor pays initiative attention, initiates a return visit, and implements dynamic chronic disease management and health education; the IoT platform will also perform overall big data analysis on the situation of the IoT health monitoring device, and the resident health data, etc., which are visually displayed on a large screen, to focus on chronic disease management and development situations in the community or region, and assist in establishing regional chronic disease prevention and control programs.

It should be noted that, the data processing system architecture shown in FIG. 8 is only exemplary, and system modules may be added or deleted according to actual needs, which will not be limited in the embodiment of the present disclosure.

Hereinafter, hardware corresponding to the foregoing data processing method will be further introduced. For the sake of brevity of the description, only brief description is given below.

Figure 9:
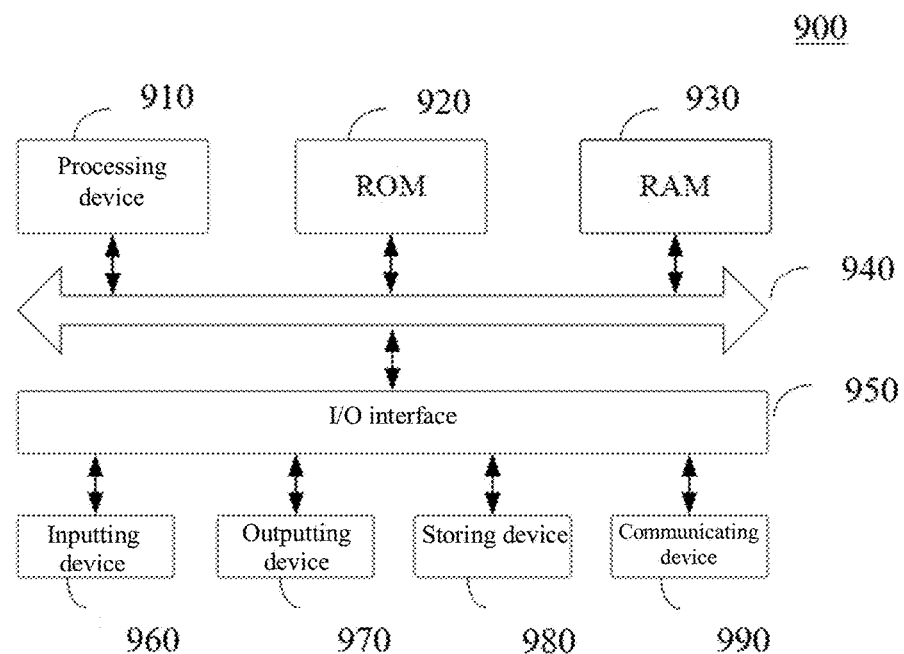
FIG. 9 is a structural schematic diagram of an electronic apparatus provided by an embodiment of the present disclosure.

FIG. 9 is a schematic block diagram of an electronic apparatus provided by at least one embodiment of the present disclosure. For example, in at least one embodiment of the present disclosure, the electronic apparatus 900 may be a detection device administration server, which may be, for example, applicable to the data processing method 10 provided by the embodiment of the present disclosure. For example, in at least one embodiment of the present disclosure, the electronic apparatus 900 may be a detection device administration terminal, which may be, for example, applicable to the data processing method 40 provided by the embodiment of the present disclosure. For example, in an example, the data processing method 10 applicable to the detection device administration server may also be executed in the detection device administration terminal. For example, in at least one embodiment of the present disclosure, the electronic apparatus 900 may be a user terminal, for example, it may be applicable to the data processing method 20 provided by the embodiment of the present disclosure. For example, in at least one embodiment of the present disclosure, the electronic apparatus 900 may be a network server, which may be, for example, applicable to the data processing method 30 provided by the embodiment of the present disclosure. It should be noted that, the apparatus shown in FIG. 9 is only an example, which does not bring any limitation to the function and use scope of the embodiment of the present disclosure.

As shown in FIG. 9, the electronic apparatus 900 may include a processing apparatus (e.g., a central processing unit, a graphics processor, etc.) 910, which may executes various appropriate actions and processing according to a program stored in a Read-Only Memory (ROM) 920 or a program loaded into a Random Access Memory (RAM) 930. The Random Access Memory (RAM) 930 further stores various programs and data required for operation of the electronic apparatus 900. The processing apparatus 910, the ROM 920, and the RAM 930 are connected with each other through a bus 940. An input/output (I/O) interface 950 is also coupled to the bus 940.

Usually, apparatuses below may be coupled to the I/O interface 950: input apparatuses 960 including, for example, a touch screen, a touch pad, a keyboard, a mouse, a camera, a microphone, an accelerometer, a gyroscope, etc.; output apparatuses 970 including, for example, a Liquid Crystal Display (LCD), a speaker, a vibrator, etc.; storage apparatuses 980 including, for example, a magnetic tape, a hard disk, etc.; and a communication apparatus 990. The communication apparatus 990 may allow the electronic apparatus 900 to perform wireless or wired communication with other electronic device so as to exchange data. Although FIG. 9 shows the electronic apparatus 900 having various apparatuses, it should be understood that, it is not required to implement or have all the apparatuses shown, and the electronic apparatus 900 may alternatively implement or have more or fewer apparatuses.

Figure 10:
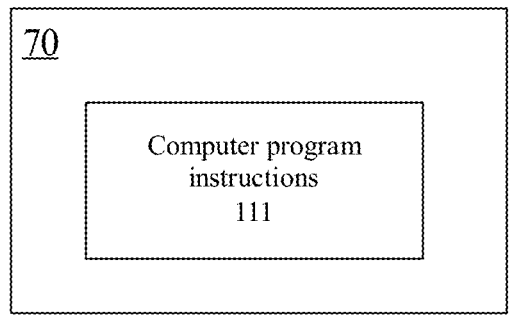
FIG. 10 is a schematic block diagram of a storage medium provided by an embodiment of the present disclosure.

FIG. 10 is a schematic block diagram of a computer-executable non-volatile storage medium 70 provided by at least one embodiment of the present disclosure. As shown in FIG. 10, the non-volatile storage medium 70 includes computer program instructions 111 stored thereon. When loaded and executed by the processor of the computer, the computer program instructions 111 execute one or more steps in the data processing method 10 provided by at least one embodiment of the present disclosure.

In the present disclosure, the term "plurality" refers to two or more than two, unless otherwise specifically defined.

Other embodiments of the present disclosure will readily occur to those skilled in the art after considering the specification and practicing the disclosure disclosed herein. This disclosure is intended to cover any modification, use or adaptation of this disclosure, which follows the general principles of this disclosure and includes common knowledge or conventional technical means in the technical field not disclosed in this disclosure. The specification and examples are to be regarded as exemplary only, with the true scope and spirit of the disclosure being indicated by the following claims.

It should be understood that the present disclosure is not limited to the precise structure described above and shown in the drawings, and various modifications and changes can be made without departing from its scope. The scope of this disclosure is limited only by the appended claims.

What is claimed is:

1. A data processing method, applicable to a detection device administration server, the method comprising:
communicating with a first detection device used for detecting a user;
sending, in response to a user terminal of the user binding the first detection device through first identification information of the first detection device, a first detection request to the first detection device, the first detection request causing the first detection device to be in a waiting state and containing user information of the user; and
receiving, after the user completes the first detection, first detection data related to the user sent by the first detection device,
the method further comprises:
sending, in response to the user terminal binding the first detection device through the first identification information of the first detection device, first guidance information of the first detection device, the first guidance information comprising at least one selected from the group consisting of function description of the first detection device and operation step description of the first detection device; and sending, in response to receiving a first detection prompt indicating that the first detection device is available or ready, a first prompt request prompting the user to perform the first detection, wherein the first detection data related to the user comprises a first physiological parameter of the user, the method further comprises:

communicating with a second detection device used for detecting the user, after the user completes the first detection, in response to the user continuing detection;

sending, in response to the user terminal binding the second detection device through second identification information of the second detection device, a second detection request to the second detection device;

receiving, after the user completes second detection, second detection data related to the user sent by the second detection device, wherein the second detection data related to the user comprises a second physiological parameter of the user, which is different from the first physiological parameter of the user; and sending, in response to a confirmation operation of the user on the first detection device and/or the second detection device, the first detection data and/or the second detection data for the user to view.

2. The method according to claim 1, further comprising:
wherein the first guidance information is presented in at least one form selected from the group consisting of text, voice, image, or video.

3. The method according to claim 1, further comprising:
sending the first identification information of the first detection device, to enable the user terminal to obtain the first identification information.

4. The method according to claim 3, wherein the first identification information of the first detection device includes an electronic identity of the first detection device.

5. The method according to claim 1, further comprising:
sending the first detection data, for the user to view, to at least one selected from the group consisting of a detection device administration terminal, the user terminal, and a network server.

6. The method according to claim 1, further comprising:
sending the second detection data, for the user to view, to at least one selected from the group consisting of a detection device administration terminal, the user terminal, and a network server.

7. The method according to claim 1, further comprising:
sending the first detection data and the second detection data, for the user to view, in a form of combination detection data to at least one selected from the group consisting of the detection device administration terminal, the user terminal, and the network server.

8. A detection device administration server, comprising:
a memory and a processor,
wherein instructions are stored in the memory, and when loaded and executed by the processor, execute the method according to claim 1.

* * * * *